(12) United States Patent
Bloebaum et al.

(10) Patent No.: US 10,560,571 B2
(45) Date of Patent: *Feb. 11, 2020

(54) TECHNIQUE FOR OBTAINING CALLER-ORIGINATED ALERT SIGNALS IN IP-BASED COMMUNICATION SESSIONS

(71) Applicant: Sony Mobile Communications AB, Lund (SE)

(72) Inventors: L. Scott Bloebaum, Cary, NC (US); Charles Liu, Chapel Hill, NC (US)

(73) Assignee: Sony Corporation, Tokyo (JP)

( * ) Notice: Subject to any disclaimer, the term of this patent is extended or adjusted under 35 U.S.C. 154(b) by 8 days.

This patent is subject to a terminal disclaimer.

(21) Appl. No.: 15/710,216

(22) Filed: Sep. 20, 2017

(65) Prior Publication Data

US 2018/0013883 A1 Jan. 11, 2018

Related U.S. Application Data

(63) Continuation of application No. 11/761,606, filed on Jun. 12, 2007, now Pat. No. 9,781,257.

(60) Provisional application No. 60/917,997, filed on May 15, 2007.

(51) Int. Cl.
*H04M 3/42* (2006.01)
*H04M 3/02* (2006.01)
*H04M 7/00* (2006.01)
*H04M 3/53* (2006.01)

(52) U.S. Cl.
CPC ......... *H04M 3/42093* (2013.01); *H04M 3/02* (2013.01); *H04M 3/42102* (2013.01); *H04M 7/0051* (2013.01); *H04M 3/5322* (2013.01); *H04M 2203/654* (2013.01)

(58) Field of Classification Search
CPC ............... H04M 3/02; H04M 3/42093; H04M 3/42102; H04M 2203/651; H04M 2203/654; H04M 3/42042; H04M 3/5322; H04M 7/0048; H04M 7/0051
See application file for complete search history.

(56) References Cited

U.S. PATENT DOCUMENTS

| 5,604,797 | A | * | 2/1997 | Adcock | H04M 1/663 379/199 |
| 5,845,219 | A | * | 12/1998 | Henriksson | H04M 1/663 455/567 |
| 2004/0136346 | A1 | * | 7/2004 | Booton | H04M 3/42323 370/338 |
| 2004/0223605 | A1 | * | 11/2004 | Donnelly | H04M 3/02 379/373.01 |
| 2006/0121887 | A1 | * | 6/2006 | Chilukoor | H04M 3/436 455/412.2 |

(Continued)

*Primary Examiner* — Khaled M Kassim
(74) *Attorney, Agent, or Firm* — Tucker Ellis LLP

(57) ABSTRACT

A technique for obtaining caller-originated alert signals in IP-based communication sessions is disclosed. According to one embodiment, the technique may be realized as a method comprising the steps of: receiving, from a first user equipment and via a first communication channel, a request to initiate a communication session, the request being received at a second user equipment; in response to the request, causing a phonepage server to transmit, via a second communication channel, a caller-originated alert to the second user equipment; and rendering the caller-originated alert to alert a user associated with the second user equipment.

10 Claims, 23 Drawing Sheets

(56) References Cited

U.S. PATENT DOCUMENTS

2006/0251232 A1* 11/2006 Wuthnow .............. H04M 1/578
                                                                     379/201.01

* cited by examiner

TECHNIQUE FOR OBTAINING CALLER-ORIGINATED ALERT SIGNALS IN IP-BASED COMMUNICATION SESSIONS

RELATED APPLICATIONS

This patent application is a continuation of U.S. patent application Ser. No. 11/761,606, filed Jun. 12, 2007 and which claims the benefit of U.S. Provisional Patent Application No. 60/917,997, filed May 15, 2007, each of which is hereby incorporated by reference herein in its entirety.

BACKGROUND OF THE INVENTION

1. Field of the Invention

The present invention relates generally to a method and apparatus for exchanging information in a communication system. More specifically, the invention relates to a technique for obtaining caller-originated alert signals in IP-based communication sessions.

2. Description of the Related Art

The present evolution of data-communication is such that more and more users gain access to the Internet worldwide. The Internet has become both a source of knowledge but also a marketplace for business, and it is attracting more and more users. Currently there is a high pressure on the data-communications industry to provide solutions that allow everyone to gain access to Internet. Broadband solutions are continuously developed and both local as well as national access networks are planned and launched. The presently most common method of modem access through the telecommunications network (e.g., the Public Switched Telecommunication Network, PSTN provider) is being replaced by other ways of access with a possibility to higher data rates, e.g., through electric power and cable TV providers.

At the same time, the telecommunications industry is struggling another battle; that of providing mobility to each and every user. Traditionally, telecommunication has been focused on voice communication. With the increase of data communication however, other demands are arising (e.g., higher data rate transfer), but also new possibilities. Evolutions of mobile systems are presently in a period when more and more packet-based systems will be deployed. Packet switched systems have, in contrast to circuit switched systems, certain advantages when it comes to transfer of data-communication. In a packet switched system, a user is only utilizing a transmission resource when system control signaling or user information is transmitted. In a circuit switched system, a user is allocated a transmission resource continuously, even though no current transfer is active. Circuit switched systems have some obvious advantages in real-time voice communication, since it is difficult to predict the communication. For data-communication, it is not as important to predict the transmission resources required, since the demands on delay and delay variations are not as crucial to the communication quality as for voice. It is therefore possible to allow more users onto the transmission resources by allowing usage thereof only when there is something to transmit and leave the channel available for additional users otherwise.

One such system is the packet data evolution of the mobile communication system pursuant to the ETSI GSM specification, called General Packet Radio Service (GPRS). With GPRS, higher bit rates and more users may be allowed than what is possible today, when data communication is deployed on a circuit switched channel. GPRS is a step towards mobility for data communication users, in contrast to GSM, which is optimized for mobility for "traditional" telecommunication users, i.e., real-time voice communication users.

The data-communication run over the telecommunications networks today is usually initiated by an access to an Internet- or a mail server. A user logs on to a distant server and accesses the data-communications network through, e.g., modem pools. The user dials up the modem pool and is therefore connected to a server, from which access can be made to both local as well as global networks. Browsers like e.g., Microsoft Explorer or Netscape Navigator are used to navigate on the Internet and switch between Internet pages or addresses. Users and institutions usually design their own data objects, or homepages, on an internal or external network that provides personal information or any other kind of information. Once connected to the data network a user may access these data objects by entering the correct address. The address is often selected by combining a node name in the network (e.g., server name) and an arbitrary text-string. Typically, it is not trivial to find a desired data object, since the text strings and server names are not obvious.

Addressing in a telecommunications network, e.g., when engaging in a voice communication is usually performed by entering a telephone number on a User Equipment (UE), like a mobile telephone. A telephone number is a world-wide, unique addressing string. A calling party (A-party) dials the addressing string (B-number) to the called party (B-party). Dependent on what type of network the A-party is a subscriber on, the call request is routed through one or several public telecommunication networks to the correct addressee and the communication may begin.

The above principle also applies when a user wishes to connect to the Internet from a computer connected to a telecommunications network. The user connects to a data-communications network by dialing a B-number to a modem pool, from which accessing the data-communications network is possible. There are no information or interaction possibilities with the called server other than this access opportunity.

Applicants have identified that there is a problem in the present way of accessing the Internet for specific data objects because of the non-obvious way of addressing data objects. There is further a need in the telecommunications industry to provide a simpler way of accessing the Internet and to guide a user by other means than a modem number to call, from where the user is left on her own to be further guided to the desired homepage or data object.

SUMMARY OF THE INVENTION

The present invention overcomes the above identified deficiencies of identifying and finding a data object and navigating between a set of data objects by applying a novel connection between a data-communications network and a telecommunications network.

In one aspect of the present invention a technique for connecting a dialed B-party number to a data object is described. A data object can for example be graphical, text, sound, voice, animations, static or dynamic pictures, or any combination. The connecting of a B-party number to a specific data object, hereafter referred to as phonepage, will allow an A-party direct access to information that a B-party wishes to display to a calling party. The phonepage resides in a memory in a telecommunications network, or in a memory in a data-communications network connected thereto. The phonepage may have a similar appearance to an Internet web page, but may also take other appearances. The displaying of the phonepage may be made dependent upon the capabilities of the A-party user equipment.

Dependent on the type of equipment used by the A-party, the node storing the phonepages may, upon detection of type of equipment, select the most advantageous way of displaying a selected data object.

Also, dependent on the A-party user equipment, the phonepage may provide different levels of interaction possibilities, i.e., only display information, or be a fully interactive data object with a duplex communication between the A-party and the node housing the memory in which the phonepage is stored.

The phonepages may be configured to be displayed automatically or by indication from the A-party. In a variant of the invention also a B-party has the same capabilities of obtaining phonepages upon reception of an A-number in conjunction with an incoming call.

In another aspect of the present invention, a node in a data-communication or telecommunication system is described. The node consists of at least a database memory including at least indications of the phonepages and upon access from a remote request, respond with said indication.

The transfer of the indication to a calling A-party may be dependent on type of connection and access technology used in the connection. For example in a connection where both circuit switched and packet switched communication is simultaneously possible, the indication may be transferred on a packet switched communication resource and, e.g., voice communication may be initiated on the circuit switched communication resource. In other types of connections, two data flows may be set-up on one or several simultaneous packet switched communication resources, e.g., speech and data transfer. Another example is when voice communication is initiated over a circuit switched communication resource and the phonepage indications are transferred over a packet switched channel with limited performance such as an SMS channel.

BRIEF DESCRIPTION OF THE DRAWINGS

The invention will now be more thoroughly described and features and advantages will become readily apparent by reading the following detailed description, where references will be made to the accompanying figures, where.

DETAILED DESCRIPTION

First a network overview. The present invention will now be described with references to a telecommunications system based on GSM as a circuit switched communication system and GPRS as a packet switched communications system. It should however be noted that the embodiments described are to be considered exemplary and that other packet and circuit switched systems may equally well be considered, both fixed—as well as mobile—and with any access technology, e.g., Time Division Multiple Access (TDMA), Code Division Multiple Access (CDMA), Frequency Division Multiple Access (FDMA), Orthogonal Frequency Division Multiple Access (OFDMA), Time Division Duplex (TDD), Frequency Division Duplex (FDD) or any combinations thereof. The invention is not restricted to any specific type of communications network or access technology.

Figure 1:
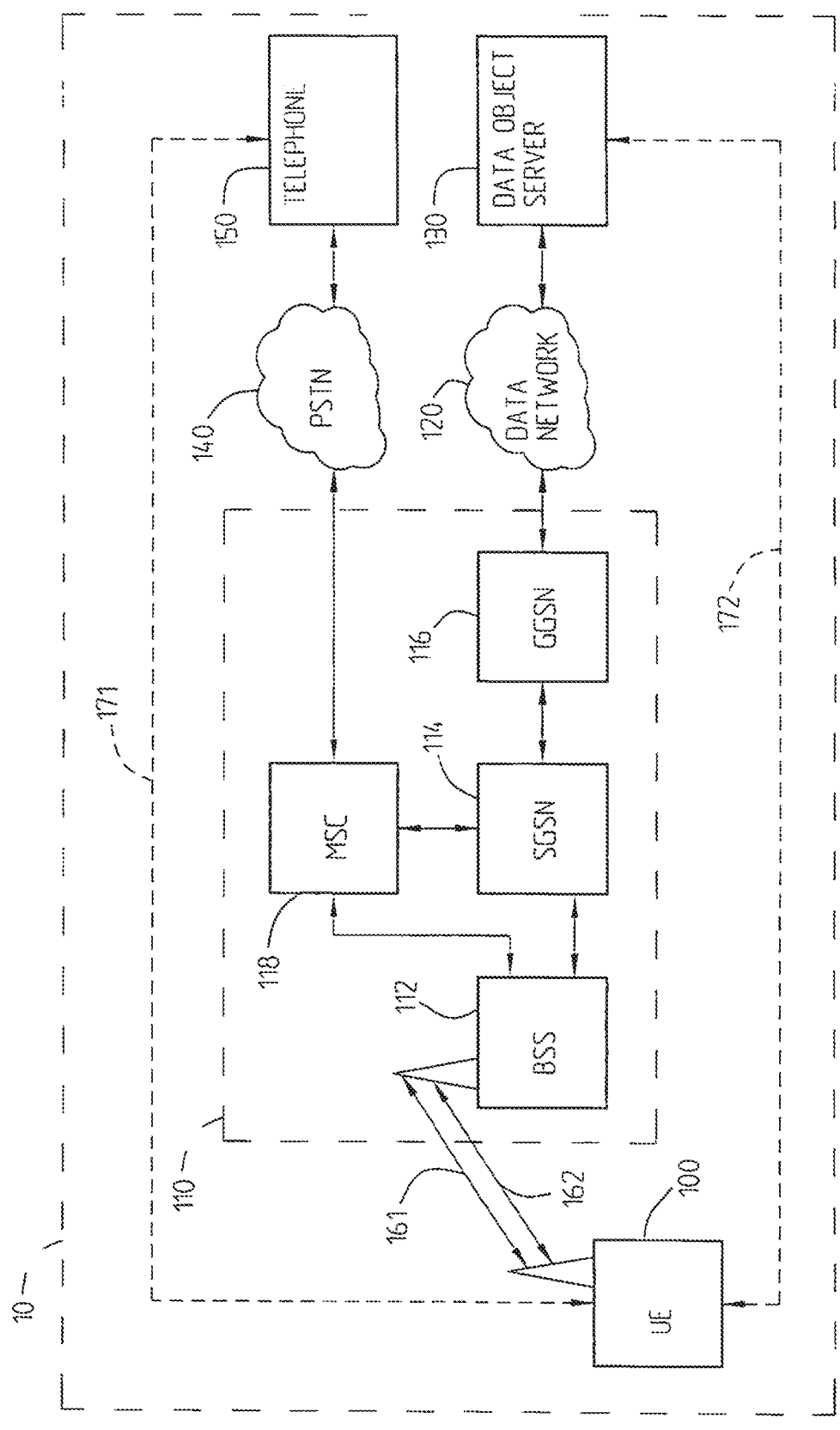
FIG. 1 illustrates an overview of a communication infrastructure overview according to one embodiment of the invention.

FIG. 1 illustrates a communication infrastructure overview, 10, where a number of different communication networks are interconnected. FIG. 1 includes both nodes included in a Circuit Switched (CS) mobile communication network, e.g., a Mobile Switching Center (MSC), 118, and Base Station Subsystem (BSS), 112, as well as nodes included in a Packet Switched (PS) mobile communication network, e.g., Serving GPRS Support Node (SGSN), 114 and a Gateway GPRS Support Node (GGSN), 116. Typically, the SGSN includes functionality such as re-segmenting data packets according to one protocol into data packets according to protocols used over the air interface. The SGSN also includes control mechanisms for one or several BSS, 112 as well as Quality of Service (QoS) mechanisms. The GGSN includes functionality required to maintain communication between a mobile packet data network and other packet data networks, e.g., data network 120. The CS part of the network connects to a PSTN network, 140, and the PS part of the network connects to a data network, 120. The data network may be both an external or internal network, i.e., with global or limited access possibilities. As shown, the PS and CS parts of the network may also be interconnected by way of an interface between the MSC, 118 and the SGSN, 114. The BSS, 112, may serve both the PS as well as the CS part of the network with packet switched (161) as well as circuit switched (162) communication resources over the air, to provide mobility to both PS and CS service users and their User Equipment (UE), 100. The UE, 100, may for example be a mobile telephone or a mobile telephone connected to any kind of data equipment, e.g., Personal Digital Assistance Devices (PDA) or laptop computer. The PSTN, 140, provide users (user devices) connected to the fixed network with service, e.g., to "plain old telephones" (POTs), facsimile or data modem devices, 150. Other examples of devices connected directly or indirectly to the PSTN, 140, are ISDN terminals and communication devices connected via a Digital Subscriber line (DSL) (e.g., ADSL, HDSL and XDSL).

The data network, 120, typically includes one or several routers (not illustrated) and data bridges such that several nodes may be interconnected and communicate with each other. The data network used in connection with the present invention includes also a data object server, 130. Typically, pluralities of data object servers are included in a data network, although, for reasons of explanation and clarity, only one data object server, 130, is illustrated in FIG. 1. Examples of data networks are Internet and Intranet networks. The UE, 100, may obtain a complete logical connection 171 to an indicated B-party telephone, 150, connected to the PSTN, 140, through the CS communication channel, 162, provided between the UE, 100, and the BSS, 112, and further via the MSC node, 118, over which conversation may be conducted between either party UE 100 and telephone 150. Similarly, the UE, 100, may obtain a complete logical connection 172 to equipment, e.g., data object server, 130, connected to the data network, 120, through the PS communication channel, 161, provided between the UE, 100 and the BSS, 112, and further via the SGSN, 114 and GGSN, 116, node, over which data may be sent between either party UE 100 and data object server 130.

Element 140 can in some embodiments be a PSTN/ISDN, and then element 150 could also be a mobile phone. In other embodiments there can also exist the case of all IP, i.e., UE 100 has real-time voice communication with a packet data device.

Now for subscriber description. According to one aspect of the present invention a data object server, 130, includes graphical information objects, i.e., phonepages, associated to a telephone number. The telephone number is identical to a subscriber number, i.e., an A- or B-number, addressing an originating user equipment or a terminating user equipment, respectively. The A-party, upon dialing a B-number, connects to a data object server, 130, by way of PS communication channel and receives a data object, i.e., a "phonepage" stored in a memory position in the data object server, with a memory address corresponding to the B-number dialed. The phonepage may consist of information about the B-party, or it may simply provide an immediate access to an internal or external data network as maintained by the B-party subscriber. Alternatively, the B-party phonepage may consist of information regarding a B-party user, e.g., phone number, address and other information. After having received the B-party phonepage, one or several procedures may follow. If the B-number is addressing a POT, 150, a circuit switched voice connection may be setup. If the B-number is addressing another device, other events may occur. This is of course also dependent upon the A-party device, UE, 100, used.

In a variant of the present invention, the UE, 100, does not support the use of a PS communication channel whereby data objects can be retrieved by other means, such as a Short Message Service (SMS) or a temporary CS communication channel. In a variant of the present invention, a PS communication channel, for example having a particular QoS, is used for conveying speech within the communication system 10 whereby the PSTN, 140, and the data network, 120, is interconnected by some means (not shown in FIG. 1).

Figure 2:
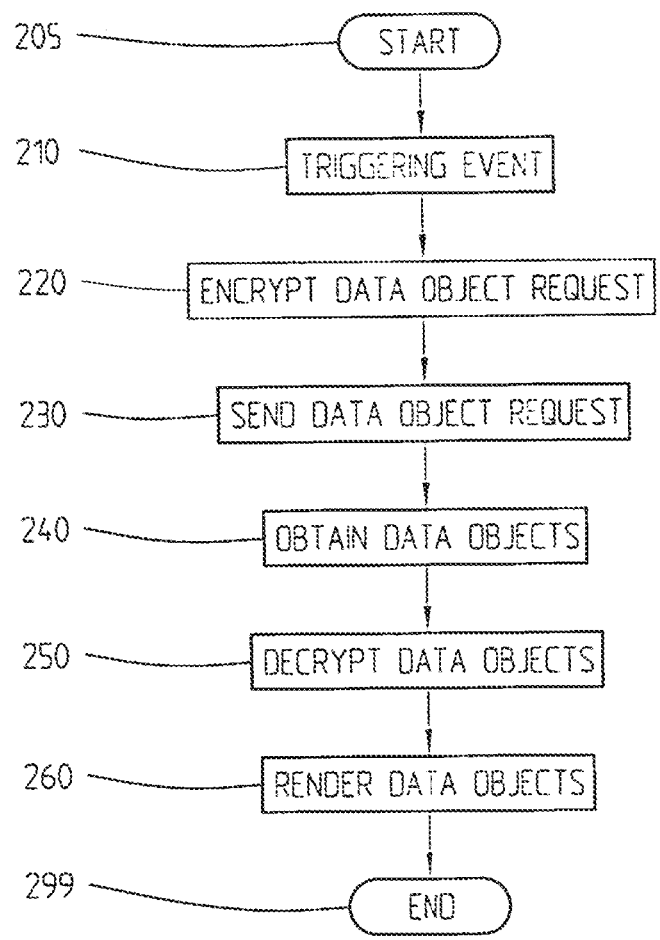
FIG. 2 illustrates a first flow diagram of a subscriber interaction in an A-party UE according to one embodiment of the present invention.

FIG. 2 illustrates a flow diagram of a procedure in a UE (like the UE, 100) for communicating a phonepage to an A-party using the UE, according to one embodiment of the present invention. In step 205, the procedure starts by an initiation from the A-party, (e.g., a UE is switched on). In step 210, a trigger of a phonepage request is indicated, either automatically (e.g., a call is terminated by the other party) or manually by the A-party (e.g., the dialing of a B-number). The triggering event, 210, may be at least one of a number of events, e.g.:

An outgoing call is or is about to be initiated.
An addressed B-party answers a call.
An addressed B-party is busy.
An addressed B-party does not answer.
An addressed B-party rejects a call.
An addressed B-party is unavailable (e.g., an addressed mobile phone is out of coverage).
An incoming call is imminent or has just started.
A conference call is or is about to be initiated.
A call is disconnected.
A call is conducted (under which several triggering events can be generated).
A subscriber is put on hold.
A new cell in the Public Land Mobile Network (PLMN) has been selected.
The location of a subscriber has changed.
A new PLMN operator is selected.
A new country of registration is made.
A UE is about to be switched off.
A UE has been switched on.
When a designated button on a UE is pressed.
In response to a talk spurt received by a UE.

A voice mail has been left to a subscriber.

An SMS has been sent to a subscriber.

And now protocol functionality. According to one aspect of the present invention a data object server, 130, includes graphical information objects, i.e., phonepages, associated with an address indication such as a telephone number, or an Internet address such as an IPv6 address. The telephone number is identical to a subscriber number, i.e., an A- or B-number, addressing originating user equipment or a terminating user equipment, respectively. The A-party, upon dialing a B-number, connects to a data object server, 130, by way of PS communication channel and receives a data object, i.e., a "phonepage" stored in a memory position in the data object server, with a memory address corresponding to the B-number dialed. The data object server may comprise the phonepage with information about the B-party directly, or it may simply provide an immediate access to a location in an internal or external data network as maintained by the B-party subscriber, i.e., the object server 130 first functions as a number server providing a translation of the provided B-number to a corresponding URI where the phonepage resides, which may be at a physically separate phonepage object server. The translation and provision of the actual requested phonepage can be either transparent, i.e., the phonepage number server forwards, or dispatches, the phonepage request to an appropriate phonepage object server, which phonepage object server communicates directly, or indirectly via the name server, to the requester, or the phonepage number server returns the URI of the requested phonepage to the requester after which the requester will be redirected by using the URI to request the desired phonepage.

The B-party phonepage may comprise information regarding a B-party user, e.g., phone number, address and/or other information. The B-party phonepage may also comprise information regarding the addressed B-party's user equipment, which, for example, can be a fax. After having received the B-party phonepage, one or several procedures may follow. If the B-number is addressing a POT, 150, a circuit switched voice connection may be setup. If the B-number is addressing another device, other events, such as when a pay service is used, may occur. This is of course also dependent upon the A-party device, UE, 100, used.

According to another aspect of the present invention a phonepage can be associated with an Internet address such as an IPv6 address, SIP address or an email address. For example, an A-party, upon setting up a communication link with a web-page to a thermostat of his or her summer house to thereby control/check the temperature, will receive a data object which, for example, identifies the thermostat and comprises a link to the manufacturer's home page, and/or other communication means to the manufacturer. In another example, an A-party desires to set up a conference call by means of a conference telephone located in a conference room. Upon initiation of the communication, the A-party will receive a data object which is linked to the conference telephone by means of its telephone number, http address or IP address. The data object, the conference telephone's phonepage, can suitably comprise information concerning the locality of the conference phone, the size of the conference room, and/or a booking schedule. In still another example, an A-party desires to transfer a facsimile. Upon choosing or initiating transmission to a fax-machine, the phonepage of the fax machine is requested and returned to the A-party. A phonepage of a fax machine might comprise information concerning the locality of the fax, whose fax machine it is, and/or who has access to the fax machine. In still a further example, an A-party desires to transfer an email to a B-party. Then, upon choosing or writing the email address, i.e. perhaps even before a message is composed, the phonepage of the email address is requested and returned to the A-party. A phonepage of an email address might comprise information concerning the owner, the B-party user, of the email address, other means of communication with the owner, and/or schedule or availability of the owner. A phonepage is a data object that is linked to a unique identifier such as a telephone number or an internet address such as an IPv6 address, but not located or retrieved from the place that the unique identifier identifies.

The A-party initiates a request in step 230, possibly after encryption in step 220, and sends this request via a communication channel, (e.g., packet switched as illustrated in FIG. 1) to a data object server. The data object request may include at least one of a number of different parameters, e.g.:

- A requested protocol to be used for transmission (e.g., WAP, WML, HDML, HTML).
- An identification of a data object server (e.g., a server name or a plain IP address).
- A code denoting what kind of event that triggered the data object request (e.g., outgoing call setup).
- The indicated B-number associated to at least one B-party equipment.
- An A-party identity, e.g., an A-number of a mobile station.
- A network address of the A-party (e.g., IP address) used by the data object server when returning a requested data object.
- A capability code indicating the displaying capabilities of the A-party (e.g., screen resolution, audio, etc.).
- A code indicating an encryption scheme or encryption key used.
- A code indicating in what country the mobile station is registered (country code).
- A code identifying the current PLMN (V-PLMN) operator or the PLMN where the A-party has a subscription (H-PLMN) or both.
- A code indicating the vendor of the mobile station and the type of the mobile station.
- A code indicating an equipment unique identity.
- A validation code (e.g., a checksum) of the parameters.

The data object request in 230 may, according to a variant of the invention, be answered by the data object server in an encrypted format, in which case a decryption in step 250 follows the reception of the response in the user equipment.

In the next step follows a rendering procedure in step 260, where the data objects are displayed according to the capability of the UE after which the procedure is ended in step 299. Typically after step 299, there will follow one or several procedures according to the capability of the A-party UE or the type of equipment addressed by a B-number. For example, a call may be setup or a call may be disconnected. According to one of the above mentioned embodiments, where a continuous triggering event is that a call is conducted, special advantages may be relevant (e.g., commercial information may be sold in response to a dialed B-number allowing easy payment for such information).

Figure 3:
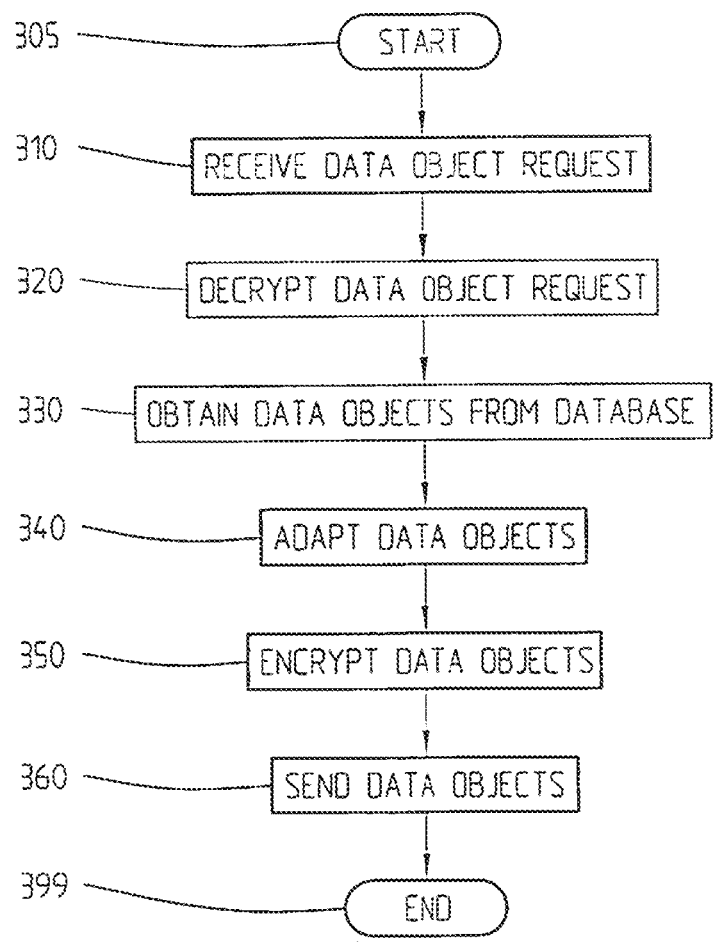
FIG. 3 illustrates a first flow diagram of a subscriber interaction in a data server according to one embodiment of the present invention.

FIG. 3 illustrates the corresponding procedures in a data object server (like the data object server 130), wherein, in step 305, the procedure starts and in step 310, the data object server receives a request for a data object. The request may typically include at least an indication corresponding to an A- or B-number and what kind of action that triggered the request. If the request is encrypted, decryption will be made in step 320, before interpreting the content. The address indication (e.g., A- or B-number) in the request received in step 310 will be mapped with a memory address in the data object server, or to an address in the data object server, connected memory and the data object, i.e., phonepage will be retrieved in step 330. The request in step 310 may also include an indication of a UE display capability, in which case the data object may be adapted in the data object server to a specific rendering capability, step 340, of a receiving UE. If the request was encrypted, or if requested for some other reason, the data object will be encrypted in step 350 before it is returned to the requesting UE, in step 360 and then the procedure is ended in the data object server in step 399.

The above described general solution to obtain a data object connected to an address indication may of course be varied in a number of different ways, depending on, e.g., the capabilities of communication of the UEs involved. For example, a method of simultaneously requesting, encrypting, obtaining, decrypting and rendering a sequence of data objects can also be applied in a variant of the present invention.

User equipment, like mobile stations, is today developed to handle both packet switched and circuit switched communication simultaneously. These are generally referred to as class A mobile stations. Other mobile station designs allow packet switched and circuit switched communication alternatively, i.e., no simultaneous PS and CS transmission and reception. These are generally referred to as class B mobile stations.

Figure 4:
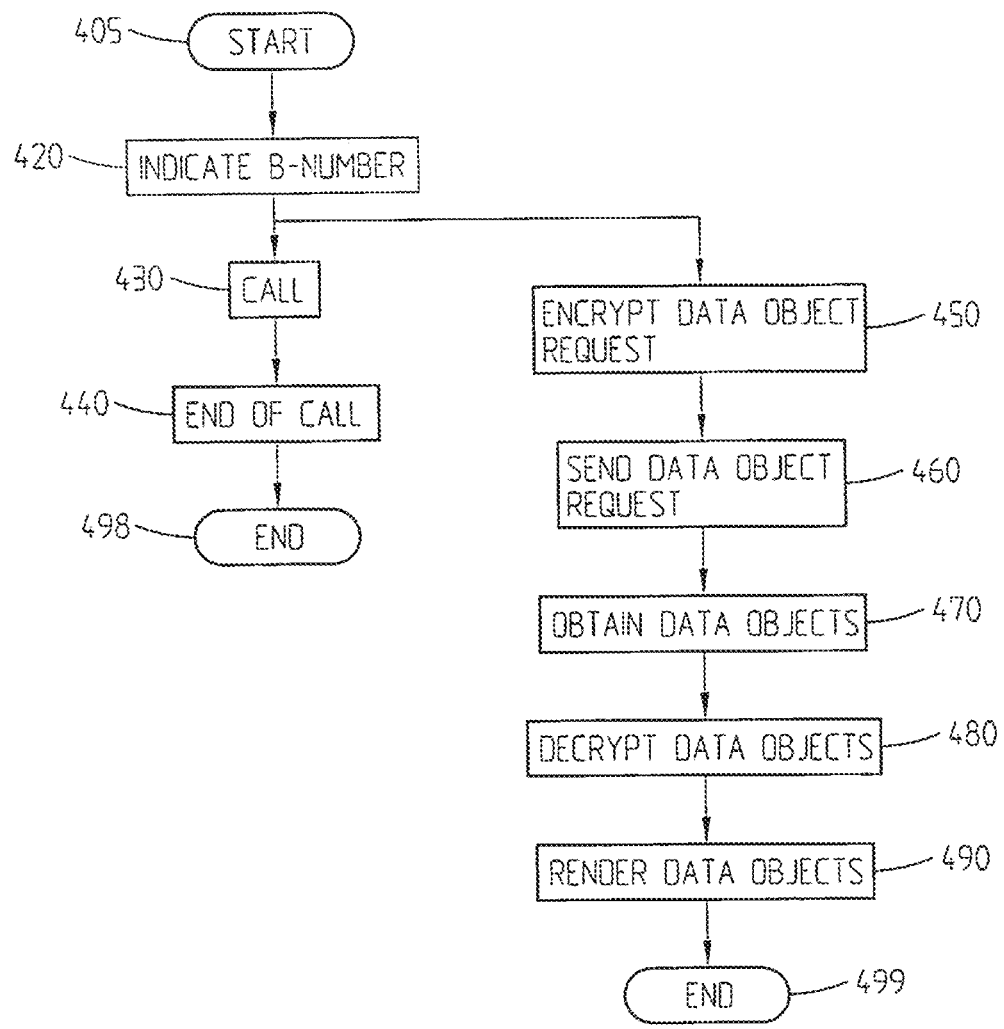
FIG. 4 illustrates a second flow diagram of a subscriber interaction in an A-party UE according to an embodiment of the present invention, when data and voice communications can be conducted simultaneously.

In FIG. 4 is illustrated a flow diagram of procedures included when a circuit switched connection is initiated from a UE which is a class A mobile station according to one aspect of the present invention. In step 405, the procedure is started when a class A mobile station is not involved in a call session and when a user, e.g., starts to indicate a B-number to a B-party, step 420, by pressing a digit, a button or by activating voice recognition means. During step 420 the entire B-number is obtained. The mobile station now start to set up two different connections, a circuit switched connection for a voice communication channel in step 430-440-498, and a packet switched communication channel for retrieval of a phonepage in step 450-499. These procedures may in a class A mobile station be simultaneous.

For the circuit switched procedures, a voice connection with a B-party is initiated in step 430, a communication recourse is assigned by a mobile network over which a telephone conversation may take place. The telephone conversation is ended in step 440 as any ordinary voice call, for example by pressing a designated button on the mobile station or hanging up a handheld part of a fixed network telephone. Ending the call also involves de-allocation of relevant communication resources within the circuit switched part of the mobile communication network as well as e.g., any PSTN resources involved in the connection.

Now follows an example of a protocol implementation between the UE (100) and the Data Object Server (130).

The phonepage service relies on the following components:

Event-detection function residing either in the user's terminal or in the network;

PhonePage Number Service which handles phonepage requests, retrieval of concerned phonepage, and downloading of the information to the involved terminals;

PhonePage Web Servers (PWS) where phonepages are stored and managed.

The PhonePage Number Service (PNS) is implemented using two node types: local and root PNS. The root PNS receives registrations from PWSs and keeps the local PNS updated. The local PNS acts as a kind of "proxy" between the terminal and the PWSs. In one aspect of the invention a local PNS contains an update client that regularly checks for updates with the root PNS. If there are entries more recent than the last successful local PNS update time, the new entries are conveyed from the root PNS to the local PNS. If communication is performed over the open Internet, information may be encrypted (e.g., using the https: or IPSec protocol). There are other means for keeping the different databases up to date. For example, the root PNS may, upon changes in its database, contact a plurality of local PNS's and, based on their individual update status, convey any changes to the local PNS's. Again information may be protected as described above.

Figure 5:
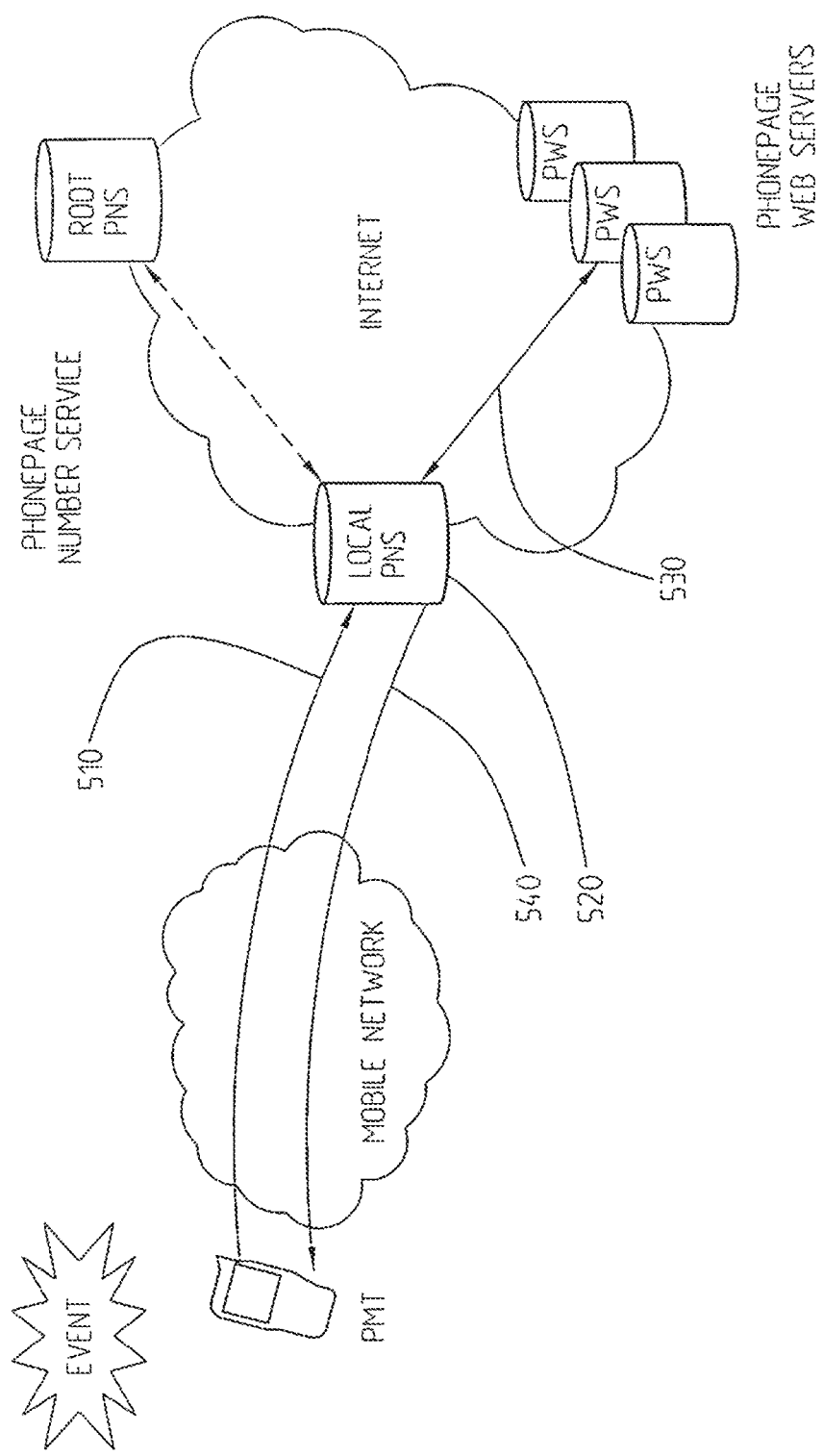
FIG. 5 illustrates a case when event detection has been implemented in a terminal.

FIG. 5 illustrates the case of a mobile phone user where the event-detection has been implemented in the terminal. The client in the mobile terminal detects an event and requests 510 a phonepage. The Local PNS 520 receives the requests and finds out in which PWS the phonepage is located. The local PNS retrieves 530 the phonepage from the concerned PhonePage Web Server. The phonepage is downloaded 540 to the terminal.

An MT-PNS PROTOCOL, first the PNS REQUEST. In general when the Mobile Terminal (MT) detects an event, the MT send a PNS Request to the Local PNS. The PNS Request from a MT client to the PNS is implemented as a HTTP request using the GET method. The URI used in the HTTP request is denoted request URI. The request URI is a URI identifying the resource upon which to apply the request. The request URI contains the host name of the Local PhonePages Number Server (PNS), a host path (e.g., denoting an appropriate server) and a parameter list. No specific header information in the HTTP request is required.

Two alternatives for the parameter list are defined. In the first alternative, the parameters are binary coded and the corresponding binary string is then Base64 encoded. In the second alternative the parameters are given using the standard URL encoding scheme for passing parameters. Below the parameter list when using the URL encoding scheme is described.

The request URI (Req_URI) is as follows:

```
Req_URI=
    scheme ":"
                          "//" host_name
                          "/" host_path
                          "?paramlist
arg=" PPReq Message Content
    scheme =          http
    host_name =       "www."
                      op_code
                      ".getpp.net"
    host_path =       "servlet/v10"
    paramlist =       "ctp=" contenttype_value
                      "&evn=" eventnum_value
                      "&otu=" otherpublic_value
                      *[("&owu "=" ownpublic_value)
                      ("&owi "=" ownprivate_value)
                      ("&grc "=" graphiccap_value)
                      ("&auc "=" audiocap_value)
                      ("&vcy "=" visitcountry_value)
                      ("&voc "=" visitopcode_value)
                      ("&hcy "=" homecountry_value)
                      ("&hoc "=" homeopcode_value)
                      ("&dab "=" databearer_value)
                      ("&tec "=" terminalclass_value)
                      ("&ven "=" vendor_value)
                      ("&tty "=" terminatype_value)
                      ("&atc "=" authentcounter_value)]
    op_code =         5DIGIT
```

The op_code is used to enable distributed PNS service. The op_code has the following value:

1. The Home Public Land Mobile Network (HPLMN) code of the subscriber.
2. If the HPLMN is unknown, the op_code is the country code (padded with preceding zeros) of the country where the subscriber is registered. For example, Sweden is coded as 00046.
3. If neither HPLM nor country code is known, the op_code is a random number between 99000 and 99999.

Parameter Values.
CONTENT_TYPE
Parameter short name: ctp
contenttype_value=1*2DIGIT
The contenttype_value is coded as follows:

| Value | |
|---|---|
| 0 | Reserved |
| 1 | HTML |
| 2 | WML |
| 3 | Text |
| 4 | SMS Text |
| 5 | Ring Tone (Nokia) |
| 6 | Group Graphics (Nokia) |

All other values are reserved.
EVENT_NUMBER
Parameter short name: evn
eventnumber_value=1*2DIGIT
The eventnumber_value is coded as follows:

| Value | |
|---|---|
| 0 | Reserved |
| 1 | User phonepage enquiry |
| 2 | An outgoing call is initiated |
| 3 | A call is answered |
| 4 | The called party is busy |
| 5 | The called party does not answer |
| 6 | The called party rejects a call |
| 7 | The called party is unavailable |
| 8 | A call is disconnected |
| 9 | An incoming call |

All other values are reserved.
Other Party's Public Identity
Parameter short name: otu
otherpublic_value=domain "_" id
domain=1DIGIT
id=("+"|DIGIT)*DIGIT
The domain field is coded as follows:

| Value | |
|---|---|
| 0 | Reserved |
| 1 | PSTN/ISDN |
| 2 | GSM IMSI |

All other values are reserved.
The id field indicates a public identification of a peer user (e.g. telephone number) that is relevant for the particular event.
Own Public Identity
Parameter short name: owu
ownpublic_value=domain "_" id
domain=1DIGIT
id=("+"|DIGIT)*DIGIT
The domain field is coded as follows:

| Value | |
|---|---|
| 0 | Reserved |
| 1 | PSTN/ISDN |
| 2 | GSM IMSI |

All other values are reserved.
The id field indicates a public identification of the mobile terminal user (e.g., telephone number) that is relevant for the particular event.
Own Private Identity
Parameter short name: owi
ownprivate_value=domain "_" id
domain=1DIGIT
id=("+"|DIGIT)*DIGIT
The domain field is coded as follows:

| Value | |
|---|---|
| 0 | Reserved |
| 1 | PSTN/ISDN |
| 2 | GSM IMSI |

All other values are reserved.
The id field indicates a private identification of the mobile terminal user (e.g., IMSI) that is relevant for the particular event.
Graphics Capability
Parameter short name: grc
graphicscap_value=xres "_" yres "_" coldepth
xres=1*5DIGIT
yres=1*5DIGIT
coldepth=1*3DIGIT
The xres field is the number of pixels on the x-axis on the relevant screen.
The yres field is the number of pixels on the y-axis on the relevant screen.
The coldepth field is the number of bits that is used to code each pixel on the relevant screen.
Example: grc=640_480_8
Audio Capability
Parameter short name: auc
audiocap_value=1*2DIGIT
This parameter is for future use.
The coding of the audiocap_value is for further study.
Visiting Country
Parameter short name: vcy
visitcountry_value=3DIGIT
This parameter indicates the country where the PMT is currently registered. The country code is given according to GSM 03.03.
Visiting Operator Code
Parameter short name: voc
visitopcode_value=2DIGIT
This parameter indicates the PLMN where the PMT is currently registered. The operator code is given according to GSM 03.03.
Home Country
Parameter short name: vhcy
homecountry_value=3DIGIT
This parameter indicates the country where the PMT has a subscription. The country code is given according to GSM 03.03.
Home Operator Code
Parameter short name: hoc
homeopcode_value=2DIGIT This parameter indicates the PLMN where the PMT has a subscription. The operator code is given according to GSM 03.03.

Data Bearer
Parameter short name: dab
databearer_value=1*2DIGIT
The databearer_value is coded as follows:

| Value | |
|---|---|
| 0 | Reserved |
| 1 | GSM Circuit switched |
| 2 | GSM HSCSD |
| 3 | GSM SMS |
| 4 | GSM USSD |
| 5 | GSM GPRS |
| 6 | W-CDMA |
| 7 | The called party is unavailable |

All other values are reserved.

Terminal Class
Parameter short name: tec
terminalclass_value=1DIGIT
The terminalclass_value is coded as follows:

| Value | |
|---|---|
| 0 | Reserved |
| 1 | Class C |
| 2 | Class B |
| 3 | Class A |

All other values are reserved.

Vendor
Parameter short name: yen
vendor_value=1*3DIGIT
The vendor_value is coded as follows:

| Value | |
|---|---|
| 0 | Reserved |
| 1 | Unknown |
| 2 | Nokia |
| 3 | Ericsson |
| 4 | Motorola |
| 5 | Siemens |
| 6 | Bosch |
| 7 | Alcatel |
| 8 | Panasonic |
| 9 | Philips |
| 10 | Benefon |

All other values are reserved.

Terminal Type
Parameter short name: tty
terminaltype_value=1*3DIGIT
The terminaltype_value is coded as follows:

| Value | |
|---|---|
| 0 | Reserved |
| 1 | Unknown |
| 2-127 | Unreserved |
| 128 | Reserved |

All other values are reserved

Authentication Counter
Parameter short name: atc
authentcounter_value=1*10DIGIT

Local PNS Response. After receiving and interpreting a PP Request message, a Local PNS server responds with a standard HTTP response message containing the phonepage content. Note that part of the phonepage content may be references (e.g., links) to resources located on other servers (e.g., the PWS) than the Local PNS. In such cases, the actual transfer of the referenced data will be carried out between the MT and the servers hosting the references resources and not pass through the Local PNS.

A L-PNS-PWS PROTOCOL. When the Local PNS receives a PNS Request from the MT, the Local' PNS looks up the address to the PWS where the requested phonepage is located. The Local PNS then requests the phonepage from the PWS by sending a HTTP request equal to the PNS Request message as described above. Note that the host_name and host_path parts of the request URI in this case are equal to the host name and path of the PWS. The PWS responds with a standard HTTP response message containing the phonepage content.

A PWS-Root PNS PROTOCOL. The protocol between the PWS and the Root PNS is based on HTTP and is used for registration and management of phonepage entries in the PNS. In order to provide a secure transport mechanism the HTTPS (Secure Hypertext Transfer Protocol) can be used.

Figure 6:
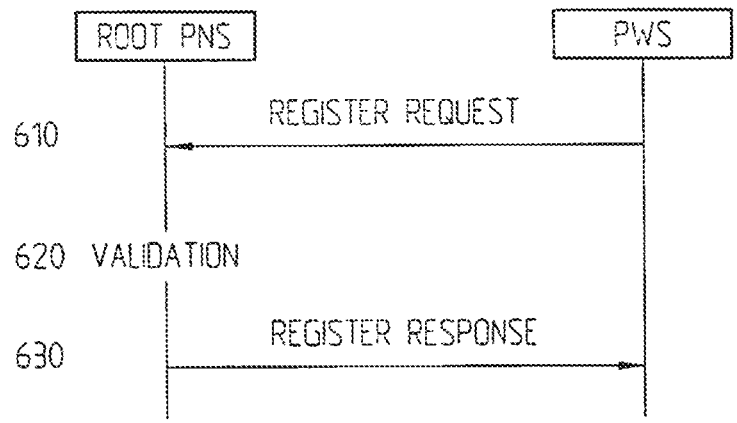
FIG. 6 illustrates how a phonepage is registered with a root PNS.

FIG. 6 shows registering a Phonepage entry. This procedure specifies how a phonepage entry is registered with the root PNS. A phonepage entry can only be created and registered upon the request from an authorized PWS. In normal cases the PWS transmits 610 a REGISTER REQUEST message to the root PNS. Then the root PNS validates 620 the REGISTER REQUEST. Thereafter if the root PNS finds the request to be valid a new entry is created and the root PNS responds 630 with a REGISTER RESPONSE message with status code 201.

In abnormal cases. If the PWS issuing the request is not authorized, the root PNS responds with status code 401. If the information in the message body of the request message is empty or not complete the root PNS responds with status code 204. If the information in the message body of the request message is unreadable or not understandable the root PNS responds with status code 400. If the identity of the entry (entry-id) in the request message is found to be invalid (e.g., not a valid identity for the domain given in the domain element), the root PNS responds with status code 406. If a root PNS entry already exists for the requested identity (entity-id), the root PNS responds with status code 409.

Figure 7:
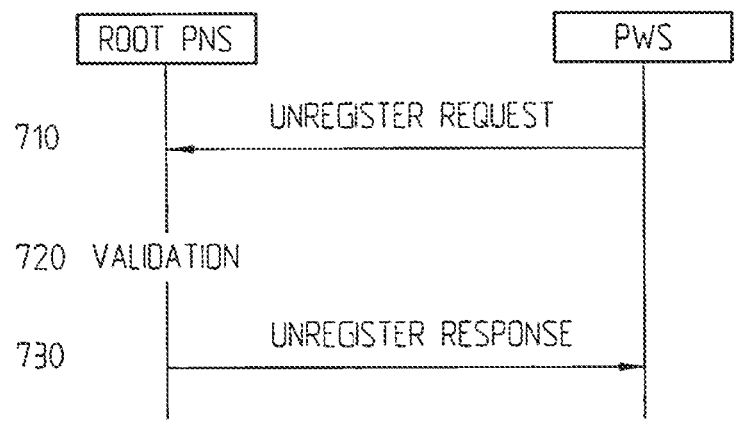
FIG. 7 illustrates how a phonepage is removed and unregistered with a root PNS.

FIG. 7 shows an UnRegister Phonepage entry. In general this procedure specifies how a phonepage entry is removed and unregistered with the root PNS. A phonepage entry can only be removed and unregistered upon the request from the (authorized) PWS that has registered the entry. In normal cases the PWS transmits 710 a UNREGISTER REQUEST message to the root PNS, as defined in section 0. Then the root PNS validates 720 the UNREGISTER REQUEST. Thereafter if the root PNS finds the request to be valid a new entry is created and the root PNS responds 730 with a UNREGISTER RESPONSE message with status code 201.

In abnormal cases. If the PWS issuing the request is not authorized or if the PWS is not the same as the one that previously registered the entry, the root PNS responds with status code 401. If the information in the message body of the request message is empty or not complete, the root PNS responds with status code 204. If the information in the message body of the request message is unreadable or not understandable, the root PNS responds with status code 400. If the identity of the entry (entry-id) in the request message is found to be invalid (e.g., not a valid identity for the domain given in the domain element), the root PNS responds with status code 406.

Figure 8:
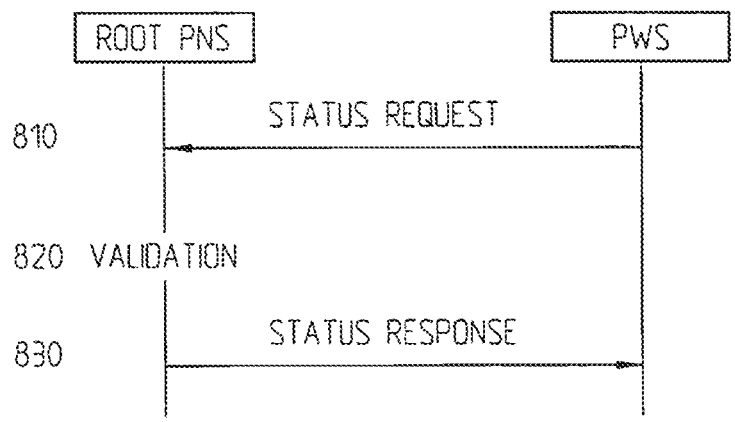
FIG. 8 illustrates how a PWS performs a status request.

FIG. 8 shows a Status Request. In general this procedure specifies how a PWS performs a status request, concerning a specific entry in the root PNS. In response to a status request, the root PNS provides information about the entry. Status information can only be obtained by an authorized PWS. In normal cases the PWS transmits 810 a STATUS REQUEST message to the root PNS, as defined in section 0. The root PNS validates 820 the STATUS REQUEST. If the root PNS finds the request to be valid, information about the entry is retrieved from the root PNS database and the root PNS responds 830 with a STATUS RESPONSE message with status code 200.

In abnormal cases. If the PWS issuing the request is not authorized, the root PNS responds with status code 401. If the information in the message body of the request message is empty or not complete, the root PNS responds with status code 204. If the information in the message body of the request message is unreadable or not understandable, the root PNS responds with status code 400. If the identity of the entry (entry-id) in the request message is found to be invalid (e.g., not a valid identity for the domain given in the domain element), the root PNS responds with status code 406.

Messages.

Register Request

General

This message is sent by PWS to root PNS whenever a new root PNS entry is registered.

Message type: REGISTER REQUEST

Direction: PWS to root PNS

Syntax

The REGISTER REQUEST is implemented as a HTTPS request using the POST method.

The request URI is: https://www.getpp.net/root PNSv10

The request URI is the absolute URI of the requested resource (e.g., denoting an appropriate servlet) on the root PNS server.

The message body contains form data, encoded using the 'application/x-www-form-urlencode' format as specified in the Hypertext Markup Language—2.0 RFC 1866 with the following fields:

| Field name | Description |
| --- | --- |
| Command | The value of this field is equal to "Register". |
| Account | The root PNS account name of the PWS |
| Password | The password associated with the account |
| EntryID | The identity of the entry to be registered with the root PNS. This is normally a telephone number in the PSTN/ISDN domain, but may be also be an identity in another domain. In the PSTN/ISDN domain, the value of the EntryID field is an international telephone number (excluding any preceding '+' character, e.g., 46702692431. |
| Domain | This specifies the domain in which the EntryID is valid. The possible values of this field are as follows: |

| Value | Meaning |
| --- | --- |
| 0 | Reserved |
| 1 | PSTN/ISDN |
| 2 | Reserved |
| 3 | SIP |
| 4 | Reserved |

| | |
| --- | --- |
| URI | The URI of the PWS where the phonepages are located. |

Register Response

General

This message is sent by the root PNS to PWS as a response to a REGISTER REQUEST message.

Message type: REGISTER RESPONSE

Direction: PWS to root PNS

Syntax

The REGISTER RESPONSE is implemented as a HTTPS response message.

The Status-Code in the response message indicates the result of a request to register a new entry in the root PNS. The root PNS responds with one of the following status codes.

Status-Code="201": New entry successfully created

"204": No content

"400": Bad Request

"401": Unauthorized PWS

"406": Not Acceptable

"409": Conflict, entry already exists

"411": Length required

"500": Internal Server Error

"509": Service unavailable

UNRegister Request

General

This message is sent by the PWS to root PNS whenever a root PNS entry is to be removed.

Message type: UNREGISTER REQUEST

Direction: PWS to root PNS

Syntax

The UNREGISTER REQUEST is implemented as a HTTPS request using the POST method.

The request URI: https://www.getpp.net/root PNSv10

The request URI is the absolute URI of the requested resource (e.g., denoting an appropriate servlet) on the ROOT PNS server.

The message body contains form data, encoded using the 'application/x-www-form-urlencode' format as specified in Hypertext Markup Language—2.0 RFC 1866, with the following fields:

| Field name | Description |
| --- | --- |
| Command | The value of this field is equal to '"UnRegister". |
| Account | The root PNS account name |
| Password | The password associated with the account |
| EntryID | The identity of the entry to be removed and unregistered with the root PNS. This is normally a telephone number in the PSTN/ISDN domain, but may be also be an identity in another domain. In the PSTN/ISDN domain, the value of the EntryID field is an international telephone number (excluding any preceding '+' character, e.g., 46702692431. |
| Domain | This specifies the domain in which the EntryID is valid. The possible values of this field are as follows: |

| Value | Meaning |
| --- | --- |
| 0 | Reserved |
| 1 | PSTN/ISDN |
| 2 | Reserved |
| 3 | SIP |
| 4 | Reserved |

UnRegister Response

General

This message is sent by root PNS to PWS as a response to a UNREGISTER REQUEST message.

Message type: UNREGISTER RESPONSE
Direction: PWS to root PNS
Syntax
   The UNREGISTER RESPONSE is implemented as a HTTPS response message.
The Status-Code in the response message indicates the result of a request to register a new entry in the root PNS. The root PNS responds with one of the following status codes.
   Status_code="201": Entry successfully removed
   "204": No content
   "400": Bad Request
   "401": Unauthorized PWS
   "406": Not Acceptable
   "411": Length required
   "500": Internal Server Error
   "509": Service unavailable
Status Request
General
This message is sent by the PWS to the root PNS to check the status of a root PNS entry.
The PWS may use the STATUS REQUEST message to retrieve information on a certain root PNS entry, e.g., upon reception of a REGISTER RESPONSE message with status code 409 (Conflict, entry already exists).
Syntax
   The STATUS REQUEST is implemented as a HTTPS request using the POST method.
   The request URI: https://www.getpp.net/root PNSv10
   The request URI is the absolute URI of the requested resource (e.g., denoting an appropriate servlet) on the root PNS server.
   The message body contains form data, encoded using the 'application/x-www-form-urlencode' format as specified in Hypertext Markup Language—2.0 RFC 1866, with the following fields:

| Field name | Description |
|---|---|
| Command | The value of this field is equal to "Status". |
| Account | The root PNS account name |
| Password | The password associated with the account |
| EntryID | The identity of the root PNS entry to retrieve status about. This is normally a telephone number in the PSTN/ISDN domain, but may be also be an identity in another domain. In the PSTN/ISDN domain, the value of the EntryID is an international telephone number (excluding any preceding '+' character, e.g., 46702692431. |
| Domain | This specifies the domain in which the EntryID is valid. The possible values of this field are as follows: |

| Value | Meaning |
|---|---|
| 0 | Reserved |
| 1 | PSTN/ISDN |
| 2 | Reserved |
| 3 | SIP |
| 4 | Reserved |

Status Response
General
This message is sent by root PNS to PWS as a response to a STATUS REQUEST message.
Message type: STATUS RESPONSE
Direction: PWS to root PNS
Syntax
   The STATUS RESPONSE is implemented as a HTTPS response message.
The Status-Code in the response message indicates the result of a status request. The root PNS responds with one of the following status codes.
   Status_code="201"; OK
   "204": No content
   "400": Bad Request
   "401": Unauthorized PWS
   "406": Not Acceptable
   "411": Length required
   "500": Internal Server Error
   "509": Service unavailable
If, and only if, the status code is 200, the message body of the response contains form data, encoded using the 'application/x-www-form-urlencode' format as specified in Hypertext Markup Language—2.0 RFC 1866, with the following fields:

| Field name | Description |
|---|---|
| PWS | The name of the PWS that has registered the entry. |
| Registration time | The date and time when the entry was registered. The value has the HTTP date/time stamp format as defined in the Requirements for Internet Hosts - Application and Support RFC 1123. |
| EntryID | The identity of the root PNS entry. This is normally a telephone number in the PSTN/ISDN domain, but may be also be an identity in another domain. In the PSTN/ISDN domain, the value of the EntryID field is an international telephone number (excluding any preceding '+' character, e.g., 46702692431. |
| Domain | This specifies the domain in which the EntryID is valid. The possible values of this field are as follows: |

| Value | Meaning |
|---|---|
| 0 | Reserved |
| 1 | PSTN/ISDN |
| 2 | Reserved |
| 3 | SIP |
| 4 | Reserved |

| URI | The URI of the PWS where the phonepages are located. |
|---|---|

Figure 9:
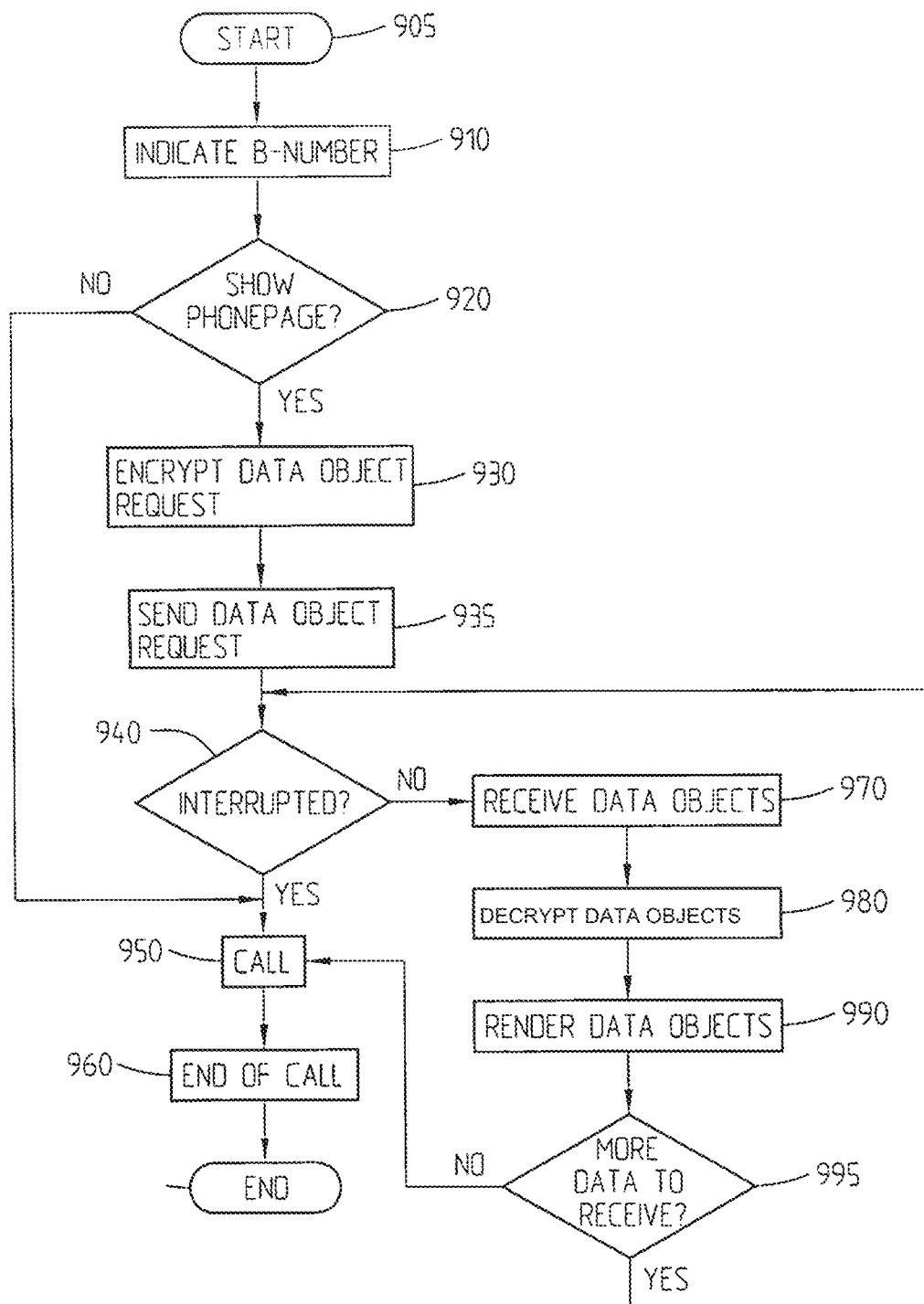
FIG. 9 illustrates a third flow diagram of a subscriber interaction in an A-party UE according to another embodiment of the present invention, when data and voice communications can not be conducted simultaneously.

Terminal Capability.
   The packet switched procedures basically follow the procedures described in connection to FIG. 4, where a data object request is sent, possibly after encryption, steps 450 and 460, and a response is received and the phonepage displayed, possibly after proper decryption thereof, steps 470-490, after which the packet switched connection also ends, in step 499.
   As mentioned above, a class B type mobile station cannot handle two simultaneous connections, one packet and one circuit switched, so another approach to retrieve a phonepage is then necessary when setting up a circuit switched voice connection
   FIG. 9 illustrates a similar procedure to that explained with reference to FIG. 4, but with a mobile station of a class B type used in the A-party, call originating end. In step 905 the procedure starts and in step 910, the B-number is indicated as described above in reference to FIG. 4. In this embodiment, a step 920 is introduced where it is possible to select if a phonepage is to be requested or not. This can typically be a selection made by the user, and/or indicated by the B-number dialed by appropriate setting. According to one embodiment of the current invention, double clicking on a designated SEND button indicates that the phone page is to be requested. If it is indicated that a phonepage is not desired, then follows in step 950-960 and 999 a circuit switched call connection and termination as explained in relation to FIG. 4, steps 430, 440 and 498.

If it is indicated that a phonepage is desired, then the following steps are to encrypt, 930, and send, 935, a data object request on a packet switched communication channel. As long as the packet session is not interrupted, 940, the download of data object continues to the A-party. Data objects are received in step 970, decrypted, if encrypted, in step 980 and rendered in step 990. In step 995 the data objects are detected and as long as there is more information to receive, step 995, and there is no interruptions in step 940, the data download continues. A possible interrupt may occur, e.g., when a user wishes to no longer wait for a complete download of a phonepage and instead initiates the circuit switched communication in step 950. This may be initiated by a time expiring or by manually indicating on a man-machine interface (MMI). At the latest, the circuit switched communication is initiated when there is no more phonepage data to download. According to another embodiment of the present invention the phonepage for a class B UE is obtained from the data object server, 130, upon call completion or whenever the UE is not involved in a call, and is stored locally in the UE being readily available upon a next triggering event.

Figure 10:
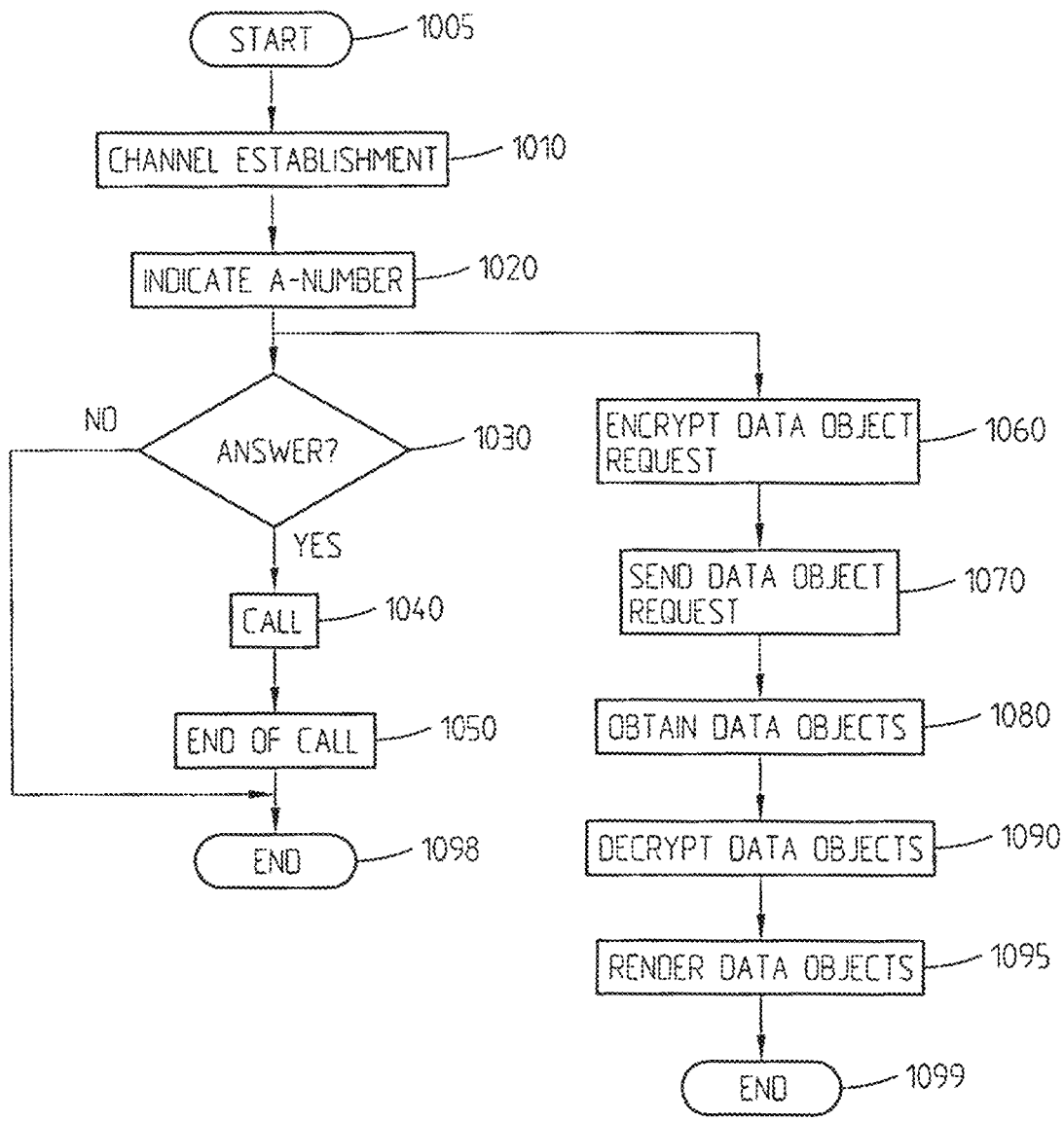
FIG. 10 illustrates a flow diagram of a subscriber interaction in a B-party UE according to an embodiment of the present invention.

So far, the retrieval of phonepages to display in A-party equipment has been addressed. It should be recognized that a B-party may similarly also display a phonepage related to a connection, preferably a phonepage identified with the A-party number. In FIG. 10 is illustrated a flow diagram of the procedures in B-party user equipment for retrieval of A-party phonepages according to one embodiment of the present invention when the B-party has the capabilities corresponding to that of a class A mobile station. The procedure start in step 1005, e.g., by an incoming call to a B-party UE. In step 1010 a communication channel is allocated between the UE and the network, 110, it is connected to. In step 1020 an indication of the call originating identity, i.e., the A-party identity, preferably, an A-number, is revealed to the B-party. Then in step 1060 and 1070, a request is sent, subsequent to encryption thereof, to a data object server. The request is, when received in the server, treated similar as the requests received from the A-party, i.e., decrypted if necessary, and responded to in the transmission of a data object related to the A-party identity. The UE receives the data objects, i.e., phonepage in step 1080 and after decryption in step 1090, if necessary, the phonepage can be displayed to the B-party user in step 1095.

If the call is answered in 1030, the voice connection may follow the same procedures as those described in relation to FIGS. 3 and 4. If the call is not answered the voice part sequence ends in 1098.

For reasons of clarification, several steps in the signaling between the UE 100 and the communication infrastructure 110; between the UE 100 and the data object server 130; have been omitted in several embodiments above, and focus has been put on the necessary and novel steps according to the invention, in the aforementioned signaling. It should be understood that other procedures (e.g., authentication, channel assignment and charging) might occur in addition to what has been described in the aforementioned signaling.
Terminal Implementation.

Figure 11:
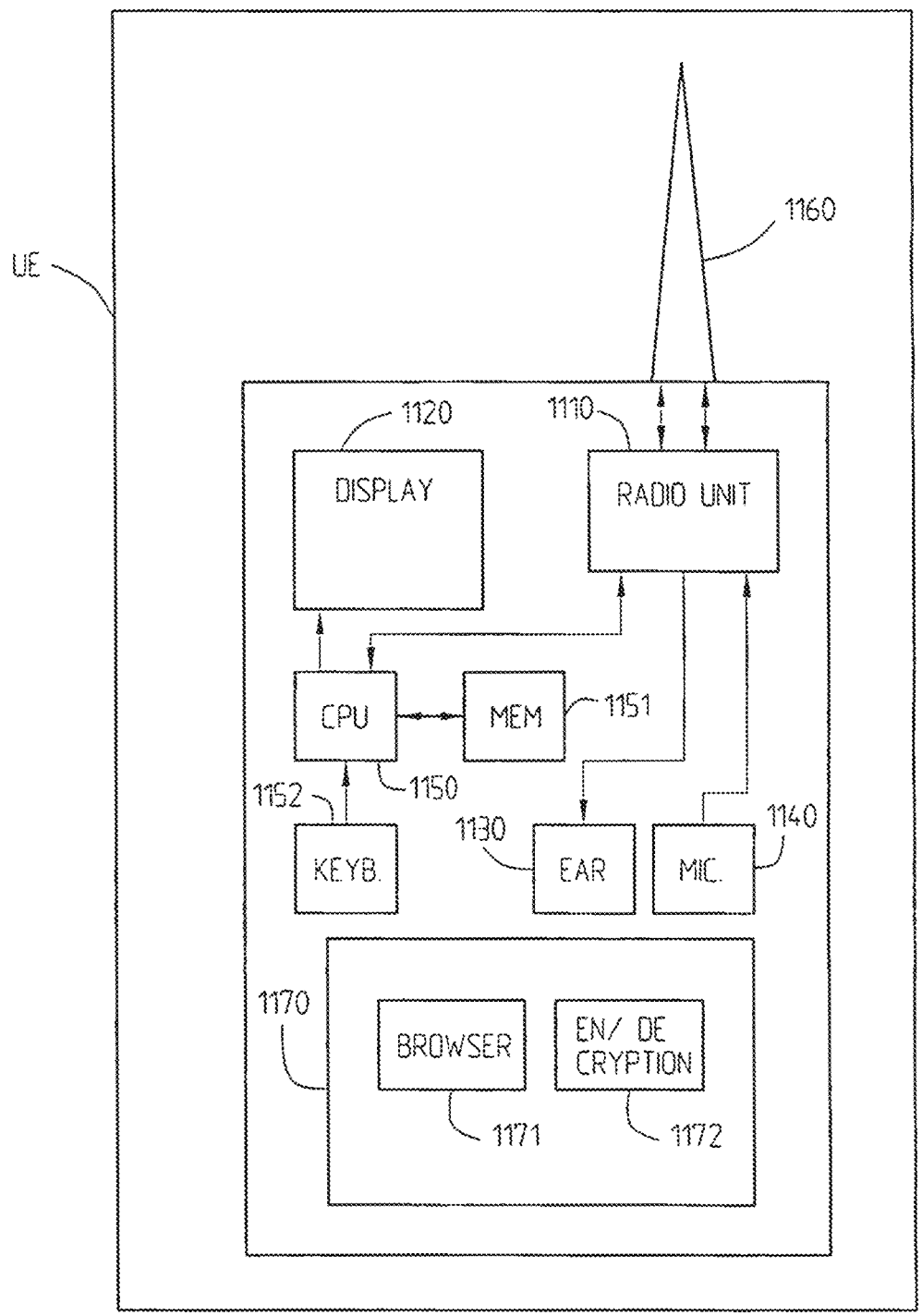
FIG. 11 illustrates an exemplary block diagram of a UE according to one embodiment of the invention.

FIG. 11 illustrates a UE according to be used in one embodiment of the present invention, where the UE is a mobile telephone or a PDA with mobile telephone capabilities. A Central Processing Unit (hereafter CPU) 1150 is connected to at least one memory unit 1151, and at least one display 1120. The CPU 1150 may also be connected to a keyboard device or area 1152 to allow subscribers to enter, for example, digits. The memory unit 1151 may be non-volatile (e.g., EEPROM or SIM card) in order to retain stored information, should power be temporarily unavailable. The CPU 1150 is further connected to a radio unit 1110 that may convert incoming and out going data to RF modulated signals. The radio unit 1110 also connects to an antenna 1160 allowing the RF modulated signals to be received/transmitted to an RF compatible media (e.g., air). The radio unit 1110 may also directly or indirectly be connected to an earphone 1130 and a microphone 1140 in order to allow voice communication. The UE may further comprise a plurality of programs 1170, e.g., a browser, 1171, that can render at least one type of data object and an encryption/decryption engine 1172 allowing data object requests to be encrypted and data objects to be decrypted. The UE may optionally be equipped with a cache memory in which it is possible to store and retrieve data objects without occupying transmission resources within the communication network 10.

Figure 12:
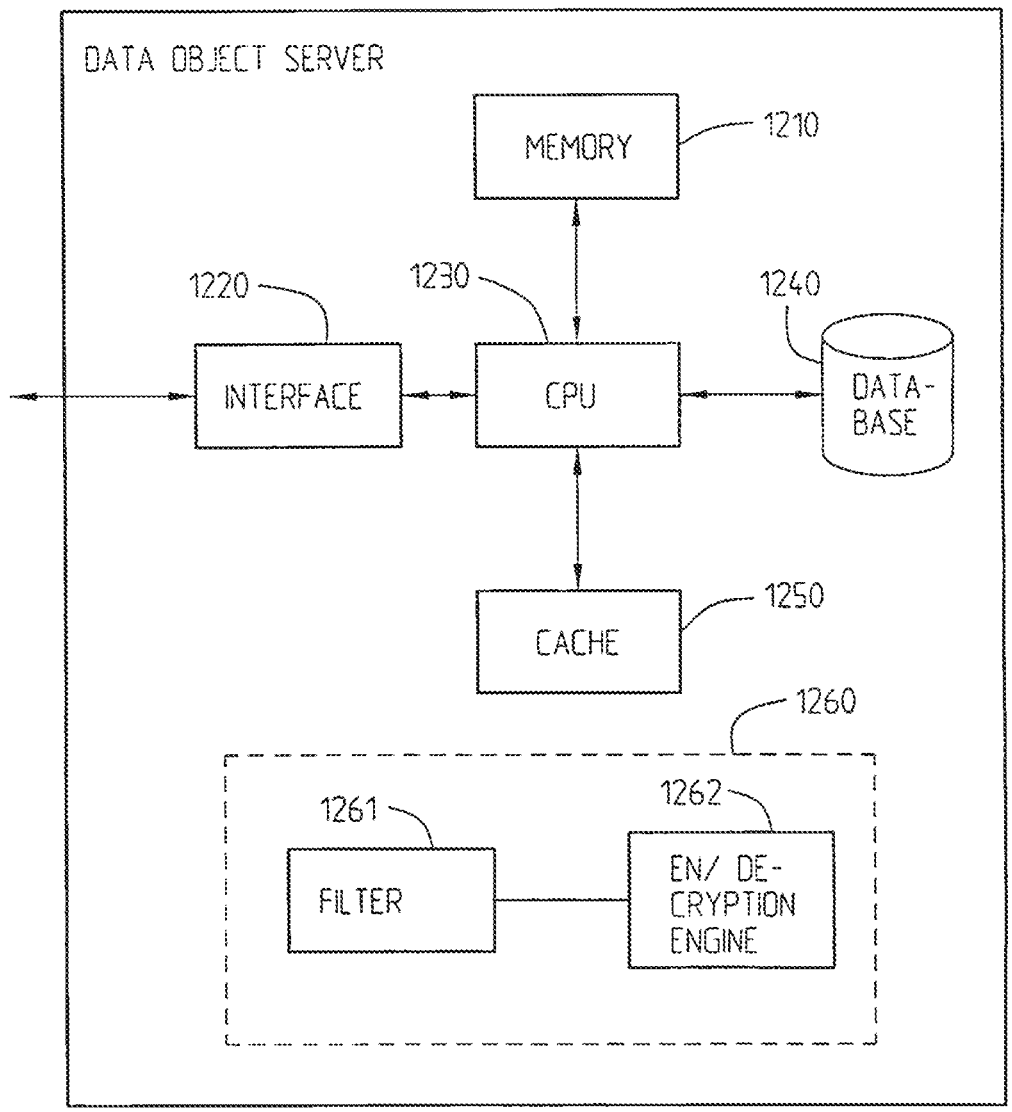
FIG. 12 illustrates a block diagram of a data object server in a data network according to one embodiment of the invention.

FIG. 12 illustrates a data object server 130, according to one embodiment of the present invention. The data object server comprises at least one CPU 1230 connected to at least one memory device 1210, a cache memory 1250, at least one database 1240 and at least one interface 1220. Memory devices 1210 and databases 1240 may be non-volatile. The interface 1220 enables the CPU 1230 to send and receive data to/from the data network 120. The cache memory 1250 allows storage of frequently used data objects so that the CPU 1230 may obtain them readily. The database 1240 contains the actual data objects that can be requested by the UE 100 via a communication infrastructure 110 and a data network 120. The data object server may also further comprise a number of programs 1260 including, but not limited to, a filter 1261 allowing the data objects to be optimized according to the rendering capabilities of the UE 100; and an encryption/decryption engine 1262 allowing data object requests to be decrypted and data objects to be encrypted.

According to a variant of the invention the blocks 1210, 1220, 1230, 1240, 1250 and 1260 may be implemented on a plurality of computers. According to another variant of the present invention, the said plurality of computers may be located at a substantial distance.

Figure 13:
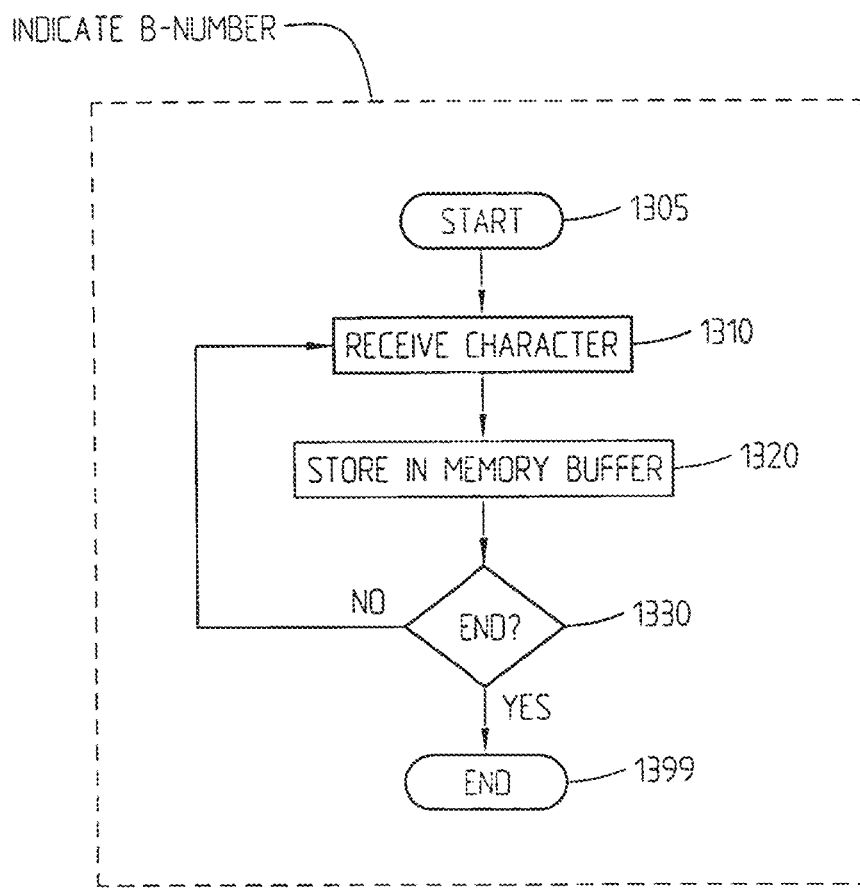
FIG. 13 illustrates a flow diagram of B-number indication procedure according to one embodiment of the present invention.

B-number indication involves any means of indicating a B-number in an A-party UE. A first example of B-number indication procedure is described with reference to FIG. 13 where the B-number indication comprises a start step at 1305 and the step 1310 of receiving a character from a keyboard arrangement. In response to step 1310, the character is stored in a memory buffer in the UE in step 1320 and it is checked if the B-number is complete in step 1330. If the number is incomplete, steps 1310, 1320 and 1330 are repeated. If the B-number is complete, the B-number indication procedure is concluded in 1399. Determination of B-number completion 1330 may or may not involve the use of timers supervising the indication procedure; a short key combination in order to minimize the number of keys pressed; designated buttons to indicate number completion (e.g., pressing SEND or CALL buttons once) or by analyzing the digits in the memory buffer for B-number completeness.

A second example of B-number indication is by means of voice detection, whereby an incoming talk spurt is successfully matched with an entry in an internal database contained in a UE 100, whereby a valid B-number could be obtained in response to the aforementioned talk spurt.

Figure 14:
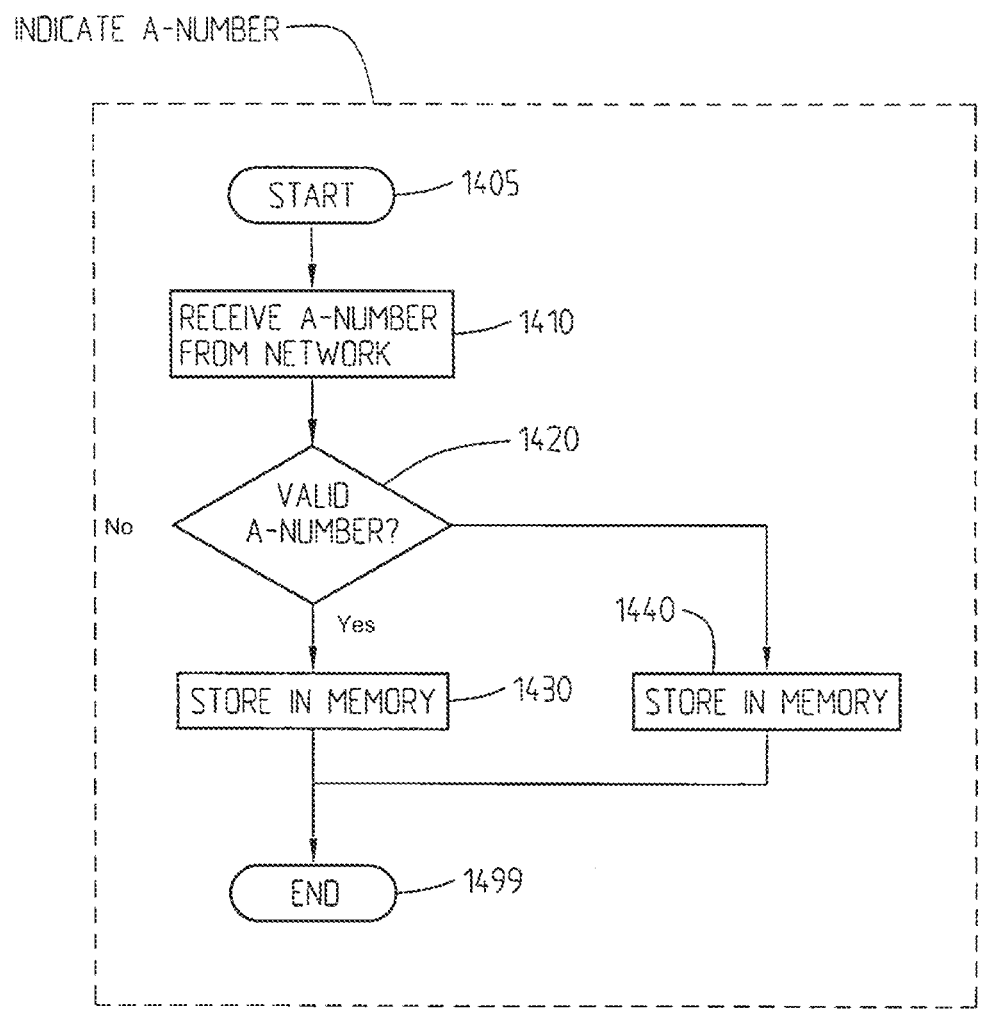
FIG. 14 illustrates a flow diagram of A-number indication procedure according to one embodiment of the present invention.

A-number indication involves any means of indicating an A-number to a said UE 100. A first example of an A-number indication procedure is described with reference to FIG. 14 where the A-number indication comprises the step 1405 of starting the procedure and 1410 of receiving an A-number from a communication infrastructure 110. In response to step 1410, it is checked if the A-number was valid (e.g., not blocked, secret or misinterpreted) and if it was valid, the A-number is stored in a memory in the UA 100 in step 1430. If the A-number was not valid, a flag indicating a non valid A-number is stored in a memory of UE 100 in step 1440. The procedure is ended in 1499.

A second example of A-number indication is by means of sending an A-number or data objects in response to an A-number directly on a logical data communication link 161.

Figure 15:
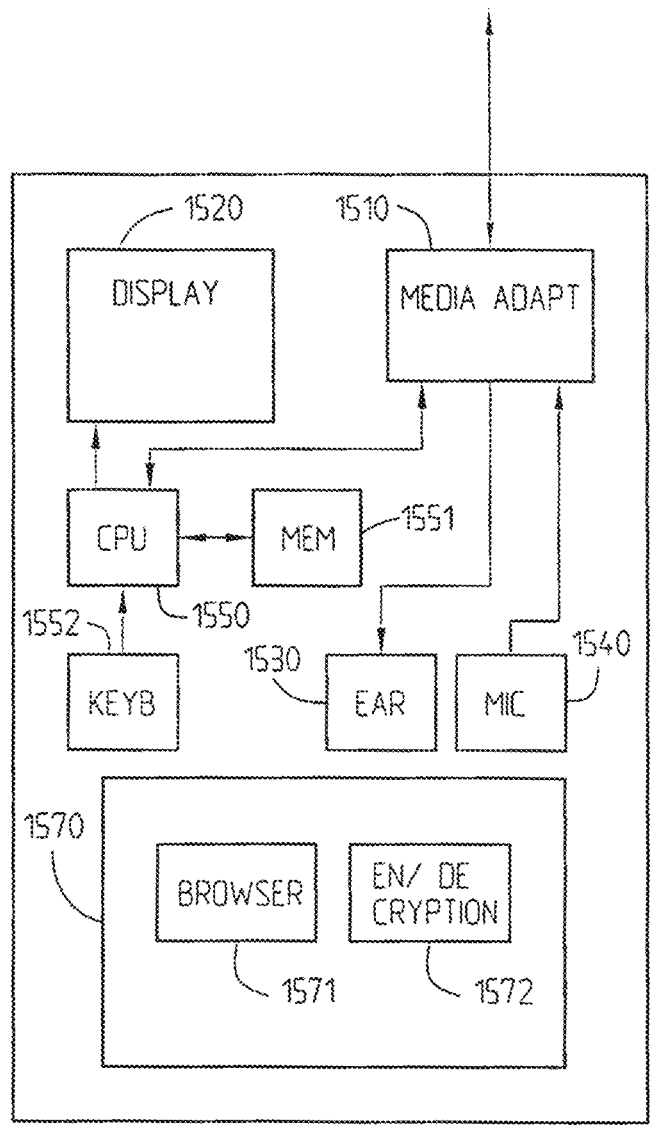
FIG. 15 illustrates an exemplary block diagram of a UE where the UE is connected to a fixed network according to one embodiment of the invention.

FIG. 15 illustrates a UE 100 according to a second variant of the invention when the UE 100 is a fixed telephone with graphic capabilities. According to this second variant, the UE 100 is equal to a mobile telephone as described in FIG. 11 but with the exception that the radio unit 1110 and antenna 1160 are replaced with a media adapter 1510 that converts incoming and outgoing signals to and from a particular media standard including but not limited to ISDN, ADSL, HDSL, VDSL and Cable networks and any combination thereof.

Figure 16:
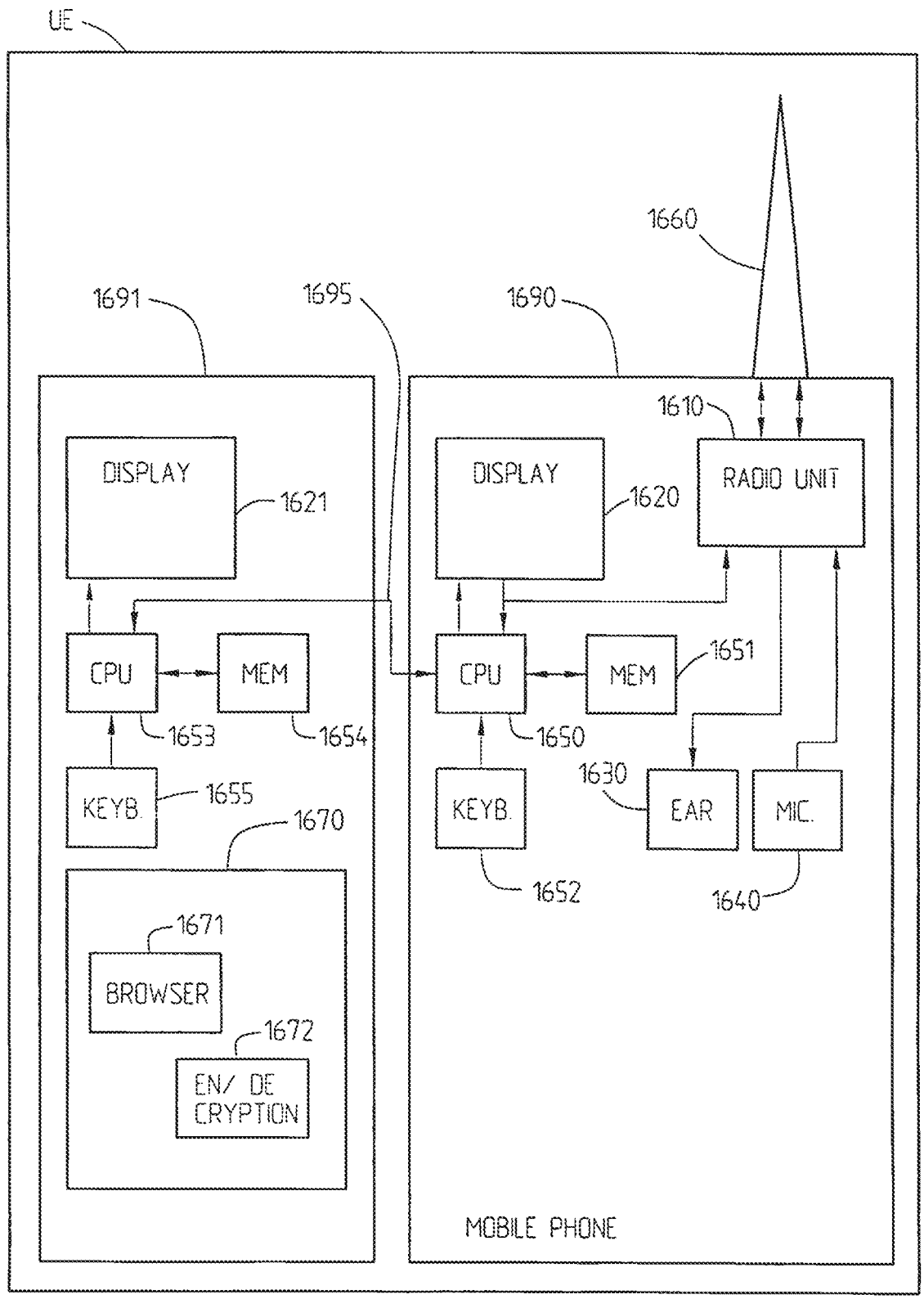
FIG. 16 illustrates an exemplary block diagram of a UE where the UE consists of a PDA and a mobile phone according to one embodiment of the invention.

FIG. 16 illustrates a UE 100 according to another embodiment of the invention when the UE 100 is a mobile telephone 1690 possibly without data object rendering capabilities, with an antenna 1660, connected to a PDA 1691 via a communication link 1695. The communication link may for example be realized with an infrared, radio (e.g., Bluetooth) or wire communication arrangement. The PDA 1691 further comprises a CPU 1653 connected to at least one memory unit 1654, and at least one display 1621. The CPU 1653 may also be connected to a keyboard device or area 1655 to allow subscribers to enter, for example, digits. The memory unit 1654 may be non-volatile (e.g., EEPROM or SIM card) in order to retain stored information, should power be temporarily unavailable. The PDA 1691 further comprises a collection of programs 1670 including but not limited to a browser 1671 that can render at least one type of data object and an encryption/decryption engine 1672 allowing data object requests to be encrypted and data objects to be decrypted. The mobile phone 1690 is further described in FIG. 11 where 1620 corresponds to 1120, 1610 corresponds to 1110, 1650 corresponds to 1150, 1651 corresponds to 1151, 1652 corresponds to 1152, 1630 corresponds to 1130 and 1640 corresponds to 1140.

There are a number of possible technologies available that are suitable for implementing phonepage functionality in the UE (phonepage client). Examples of such technologies in the context of GSM include:

SIM toolkit
WAP/WTA
Java and MeXE
Native implementation

Independent of implementation, the main function of the client is to detect call events and launch the browser to the appropriate URL determined by event type, content type, other party's identity, own identity, HPLMN, VPLMN, visiting country code, terminal capability, and other parameters as described in this document. Additionally the client could provide functions for, e.g., activation and configuration of service, security, soft-keys and menus.

As an alternative to directly launching the browser the client may send an SMS to the server which would respond with a push message (e.g., WAP push) containing the phonepage.

Now follows a description of a possible implementation based on SIM toolkit (STK). The phonepage solution can be implemented in various ways with STK. It can be achieved by combining WAP with STK. It can also be done as a stand-alone solution without connections to WAP. A phonepage application can be divided into two parts, one that is menu driven and one that is event driven. The two parts of the application will remain integrated on the SIM. The event driven part handles functions for, e.g., automatic downloading of phonepages triggered by certain call events; the phonepage format may be WAP, SMS or similar. The menu driven part of the application handles functions for, e.g., service configuration, and manual user-friendly downloading of phonepages.

The SIM hosts several parameters that can be utilized for the PP services. This adds value to the solution both for WAP and non-WAP based solution. Example of such parameters are: event type, other party's identity, own identity, visiting country code, visiting operator code, and home operator code. Additional parameters such as content type, device capability, device type and data bearer can be obtained for example by UAProf (WAP) or native in the device.

STK Combined with WAP Browser in the Phone

Figure 17:
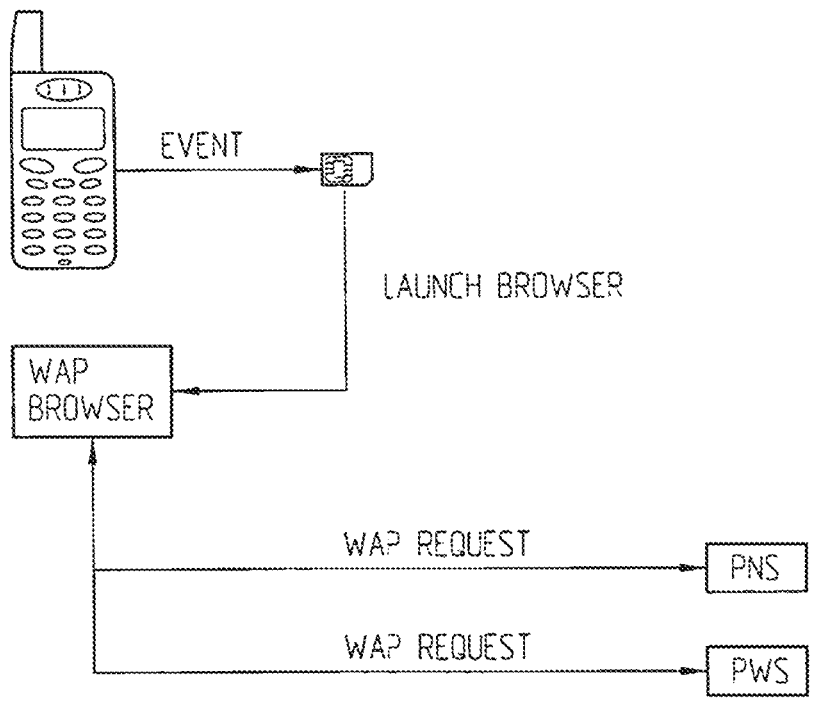
FIG. 17 illustrates a signaling overview of a client initiated launch WAP browser solution.

The WAP solution can be combined with phonepage-WAP specific parameters and content stored to be accessible on the SIM. This means that parameters that are not supported by WAP could be provided this way. The method can be applied in two ways to implement the phonepage solution. One is to use SMS for the request response in which the URLs will be downloaded or pushed from the PNS. The other (launch browser method) is to define the URL directly locally on the SIM without any preceding server communication. With the launch browser method, the SIM specifies browser, URL, gateway address and bearer among other parameters. This makes it possible for the SIM to define which WAP application that shall be addressed as well as how this shall be done. There is a standardized possibility in STK to start a WAP browser from the SIM. The solution would require support of the launch browser STK command. An overview of the corresponding signaling in the system is shown in FIG. 17. FIG. 17 shows a signaling overview of the client initiated launch WAP browser solution.

Figure 18:
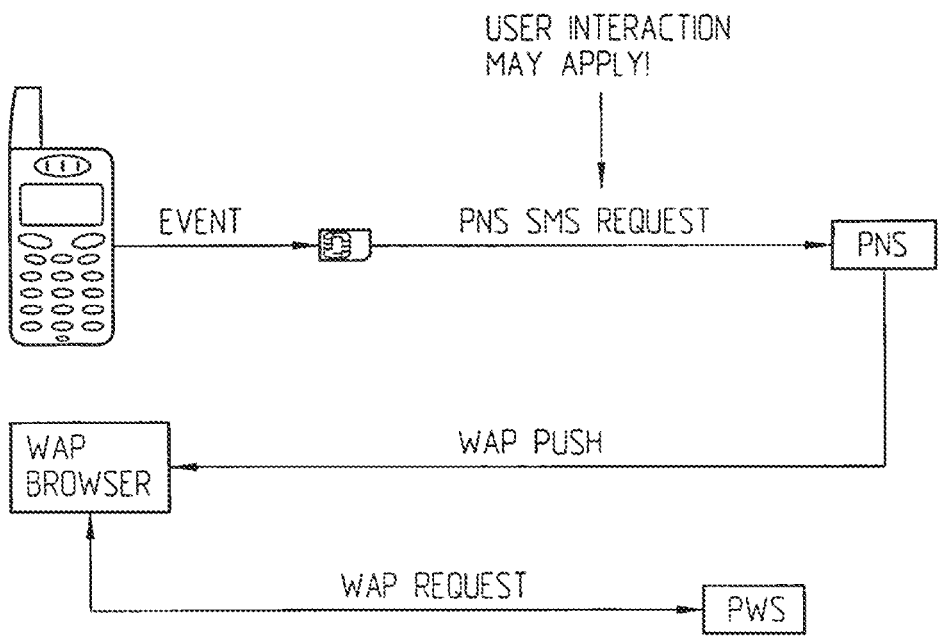
FIG. 18 illustrates a signaling overview of a push initiated launch WAP browser solution.

Another solution that requires a server request from the SIM could be implemented as a work-around if the launch browser STK command is not supported. An overview of the corresponding signaling is shown in FIG. 18. FIG. 18 shows a signaling overview of the push-initiated launch WAP browser solution. This method would require a SMS gateway to be implemented that translates the SMS message to an HTTP request to the PNS. This would then be followed by a WAP push. For this solution WAP push needs to be supported.

WAP Similar Browser on the SIM (Stand-Alone Solution)

There is also a possibility to implement the phonepage application with a WAP similar STK browser. This could be done based on the same principles as sketched for the real WAP case above. There are two different methods to implement this. With a stand alone STK application that is not integrated with the micro browser a network request would apply before the micro browser is launched. An overview of the corresponding system signaling is shown in FIG. 19.

Figure 19:
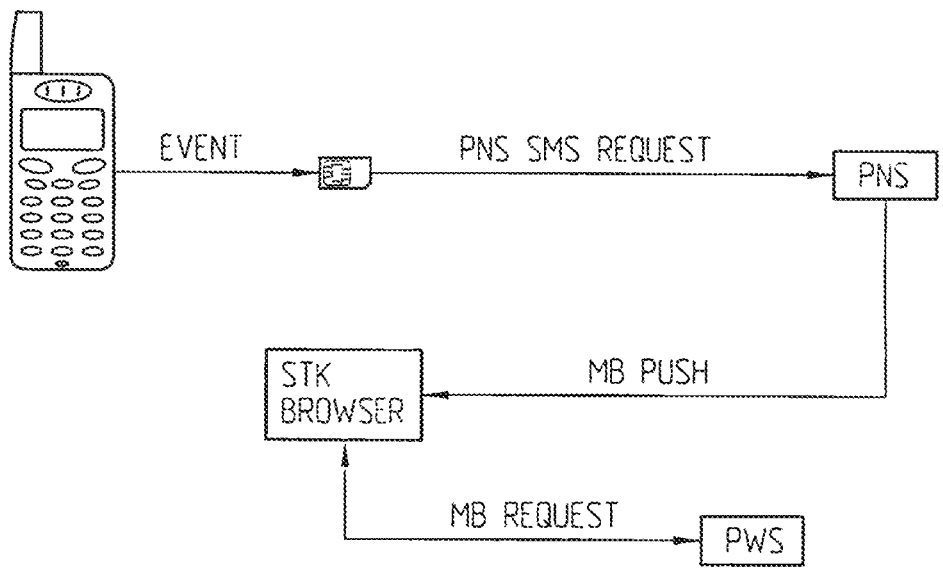
FIG. 19 illustrates a signaling overview of a push initiated launch STK micro browser solution.

FIG. 19 show signaling overview of the push-initiated launch STK micro browser solution.

Figure 20:
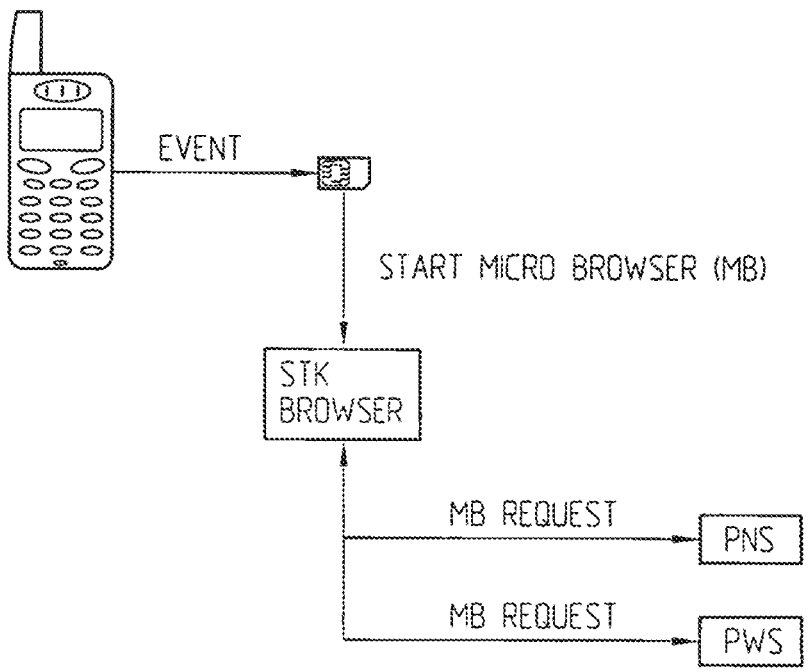
FIG. 20 illustrates a signaling overview of a client initiated launch STK micro browser solution.

The phonepage application could also be fully integrated into the micro browser. This solution would require implementation in the micro browser to support event handling. The system signaling for this scenario is shown in the FIG. 20. FIG. 20 show signaling overview of the client-initiated launch STK micro browser solution. This solution could also be implemented so that a stand-alone phonepage solution could be implemented to launch the MB directly on the SIM.

Menu Driven Part

Menus for, e.g., service configuration and manual phonepage download could be implemented using STK. Menus could be used both for the case of using a WAP browser in the phone and for the case of a micro browser on the SIM card.

Event Driven Part

STK supports detection of several call events including: an outgoing call is initiated, an incoming call, a call is answered, and a call is disconnected. There are several methods to implement the event driven part using STK:

Call control managed solution with STK EVENT handling;
Call control managed solution without STK EVENT handling;
STK menu managed solution with call set up and no STK EVENT handling;

Call Control Managed Solution with STK EVENT Handling

With this method the STK application would automatically be launched via an STK event. It can be combined with call control to add the outgoing call event. The STK application would be launched slightly after the call is set up or when the call is terminated.

Call Control Managed Solution without STK EVENT Handling

With this method the STK application would be automatically launched every time a call is to be set up. The STK application would be launched slightly after the call is set up or when the call is terminated. Nevertheless, with this method the event for the outgoing call could be handled to give the possibility for the user to download a phonepage at the outgoing call event.

STK Menu Managed Solution with Call Setup and No STK EVENT Handling

With this method the STK application would be launched from the ME menu when the user selects to set up a call this way. This means that there would be a specific set up call application on the SIM. This could be combined with access to the phone book on the SIM. Also, with this method the event for the outgoing call could be handled to give the possibility for the user to download a phonepage at the outgoing call event.

According to a variant of the present invention, the required software that needs to be added in the UE 100 may be conveyed on a SIM card. This allows implementation of the invention after it has been sold and/or without modifying the firmware of the UE 100. One apparent way of doing this is to utilize SIM Tool Kit (STK) functions using "proactive SIM" as described in the specification ETSI GSM 11.14. Some of the possible triggering events disclosed here may be mapped directly to a corresponding SIM event.

Having detected a triggering event as described above, the application residing on the SIM may invoke several actions. According to a first variant of the invention, the application sends an SMS to a data object server 130. In response to this, the data object server 130 sends a response to the UE 100 using an SMS message that is shown on the UE 100.

According to a second variant of the invention, the data object server 130 sends a response using WAP Push technology as described in the WAP standard (www.wapforum.org, WAP-165, Push Architectural Overview).

According to another variant of the invention, the required software that needs to be added in the UE 100 may be conveyed in the "repository" as described in the WAP standard (www.wapforum.org, WAP-169, Wireless Telephony Application Specification (WTA)). This allows implementation of the invention after it has been sold and/or without modifying the firmware of the UE 100. Different triggering events are mapped to different "channels" (e.g., the triggering event "incoming call" is mapped to a channel connected to the event "wtaev-cc/ic", other mappings include the WTA events "wtaev-cc/cl", "wtaev-cc/oc" and "wtaev-cc/cc".)

WAP/WTA constitutes a toolbox for creating telephony related services. This toolbox provides suitable support allowing a phonepage client to be implemented. The client resides in a so called WTA repository in the UE. The data object server is in this case WTA compatible and would among other things enable downloading of the client over-the-air.

Another technology suitable for implementing a phonepage client in the UE is Java. Using, for example, JavaPhone functionality for automatic phonepage download over, e.g., WAP, HTML or SMS can be obtained. Moreover, functionality such as a context sensitive phonepage soft-key can also be obtained. The soft-key could, e.g., automatically appear after a call, in phone address book, and in a call log. When pressing the soft-key a phonepage associated with the telephone number on the display is automatically downloaded.

Network Implementation.

The data network, 120, typically includes one or several routers (not illustrated) and data bridges such that several nodes may be interconnected and communicate with each other. The data network used in connection with the present invention also includes a data object server, 130. Typically, a plurality of data object servers are included in a data network, although, for reasons of explanation and clarity, only one data object server, 130, is illustrated in FIG. 1. In a preferred embodiment the functionality of a data object server 130 is divided into two logically different parts, a name server and an object server. A name server and an object server might be physically separated or just logically separated. The name server provides translation between address indications such as telephone numbers, events and an appropriate location of an object server where desired objects, phonepages, reside, e.g., URIs (Universal Resource Identifiers), URLs (Universal Resource Locators). An object server hosts the desired objects, the content of the phonepages. Several name servers might be provided, for example a specific name server might be operated by a mobile telephone network operator or a vendor of a mobile telephone. The particular embodiment of the user equipment will determine which name server is used. The name server can be given by the service provider used, can be based on country, be a general global, be dependent on service (such as email), or a combination. In a preferred embodiment, the user equipment associated with a specific network operator by means of, e.g., a SIM card, will automatically send a request to a name server hosted by the network operator. By automatically, as preprogrammed in, e.g., a SIM card, directing a request from user equipment to a name server hosted by the user's designated network operator (e.g., determined by a SIM card), several advantages such as related to security, speed and redundancy, can be obtained.

FIG. 3 illustrates the corresponding procedures in a data object server (like the data object server 130), wherein, in step 305, the procedure starts and in step 310, the data object server receives a request for a data object. The request may typically include at least an address indication corresponding to, for example, an A- or B-number, email address, or IPv6 address, and what kind of action that triggered the request. If the request is encrypted, decryption will be performed in step 320, before interpreting the content. The address indication (e.g., A- or B-number) in the request received in step 310 will be mapped with a memory address in the data object server, or to an address in the data object server, connected memory in another server and the data object, e.g., a phonepage, will be retrieved in step 330. As mentioned previously, the data object server can either provide a phonepage directly or just a pointer to a phonepage, the pointer suitably being a URI. In some embodiments when the data object server does not comprise the phonepages itself, the data object server will forward, i.e., dispatch, the request to the actual phonepage server or provide the requester with the URI to the phonepage. A dispatch can be described as:

The user equipment sends a request for a phonepage to the data object server;
The data object server forwards the request, with all appropriate parameters, to an actual phonepage server;
The actual phonepage server transfers the requested phonepage to the user equipment.

Alternatively, a dispatch can be described as:
The user equipment sends a request for a phonepage to the data object server;
The data object server forwards the request, with all appropriate parameters, to an actual phonepage server;
The actual phonepage server transfers the requested phonepage to the data object server;
The data object server relays the requested phonepage to the user equipment.

A redirect can be described as:
The user equipment sends a request for a phonepage to the data object server;
The data object server returns a URI of an actual phonepage server to the user equipment;
The user equipment makes a new request to the actual phonepage server using the supplied URI;
The actual phonepage server transfers either directly or indirectly (e.g., via the name server) the requested phonepage to the user equipment.

The request in step 310 may also include an indication of a UE display capability, in which case the data object may be adapted in the data object server to a specific rendering capability, step 340, of the receiving UE. The request in step 310 may also include an indication of an identity, e.g., a telephone number, of the requester, in which case a returned phonepage or phonepages can be from a selection of phonepages dependent of the identity of the requester. If the request was encrypted, or if requested for some other reason, the data object will be encrypted in step 350 before it is returned to the requesting UE, in step 360 and then the procedure is ended in the data object server in step 399.

Below follows an exemplary implementation of the procedure between the UE and the data object server.

PMT-PNS/PWS Signaling.

Redirection Scheme

Figure 21:
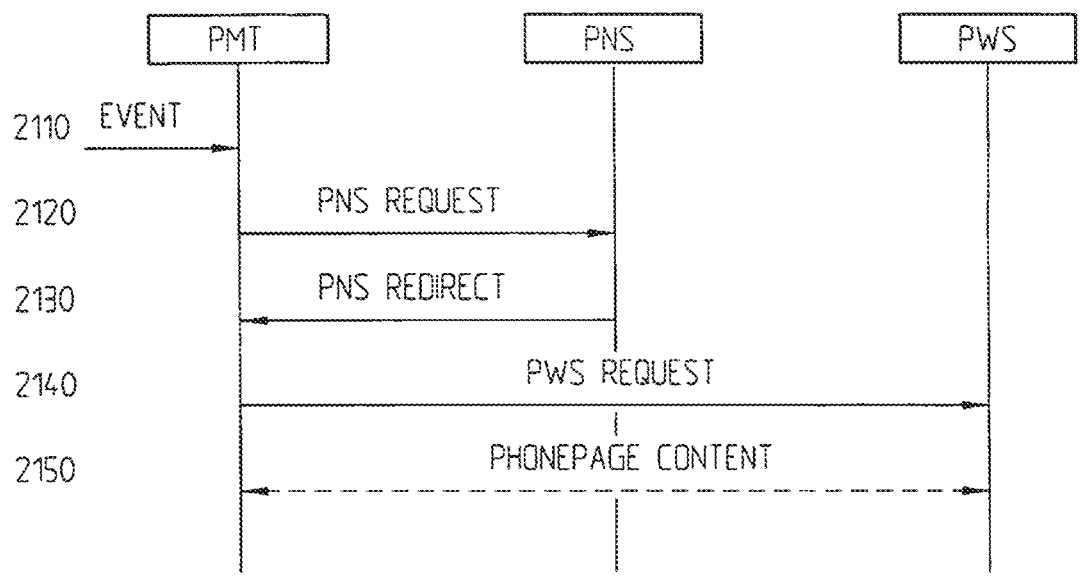
FIG. 21 illustrates a signaling scheme of a phone page redirection scheme.

FIG. 21 shows a signaling scheme depicting the redirection scheme, a phonepage redirect scheme. When the PMT encounters a triggering event 2110, for example another party is called, it gathers various parameters from its memory and from the SIM card (if any). The parameters are compiled, encrypted and inserted into a URI pointing to a PNS server. The URI is then inserted automatically in the PMT's browser. In response to this, the browser automatically sends a "PNS request" message to PNS 2120. Upon reception of the redirect message 2130, the PMT again requests phonepages 2140, now directly from the appropriate PWS using the "PWS request" message. Once connection is established with the PWS, the actual phonepage content may be exchanged between the PMT and the PWS 2150.

Dispatch Scheme

Figure 22:
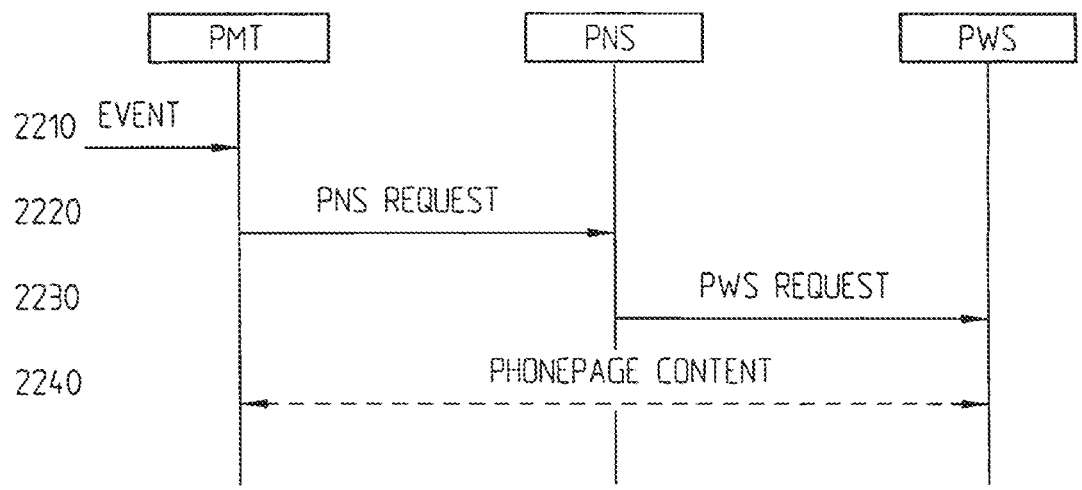
FIG. 22 illustrates a signaling scheme of a phone page dispatch scheme.

FIG. 22 shows a signaling scheme depicting a dispatch scheme, a phonepage dispatch scheme. When the PMT encounters a triggering event 2210, the parameters are encrypted and compiled into a URI pointing to a PNS server. A "PNS request" message is sent to PNS 2220, which resolves the correct PWS and relays (with modified content) the request by sending a PWS request 2230 to PWS. Once connection is established to the PWS, the actual phonepage content may be sent from the PMT to the PWS via the PNS, but directly from the PWS to the PMT 2240.

The PNS relays HTTP requests to the appropriate PWS. The PWS on the other hand, may send HTTP messages directly to the PMT. This depends on the IP network architecture, interconnection, web service requested (e.g. http: or https:) and software configuration at PNS and PWS. Special security means must also be installed. Because the phonepage service is typically highly asymmetrical, the PWS will absorb most of the extra load involved with this scheme.

GSM Call Illustration

Figure 23A:
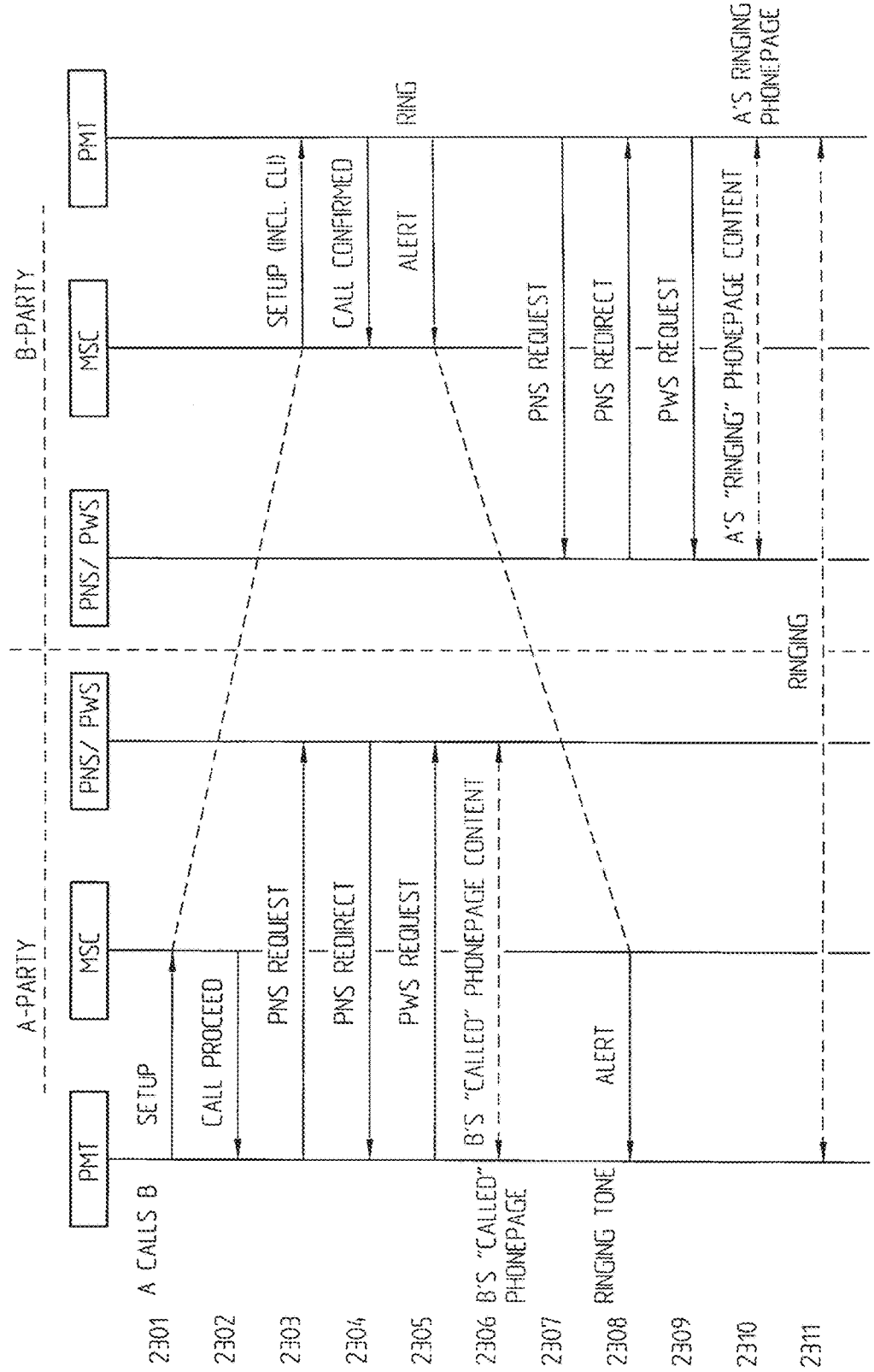
FIG. 23A-C illustrates a signaling scheme of call handling sequence between two GSM/GPRS, class A, PMTs with phone page functionality.
Figure 23B:
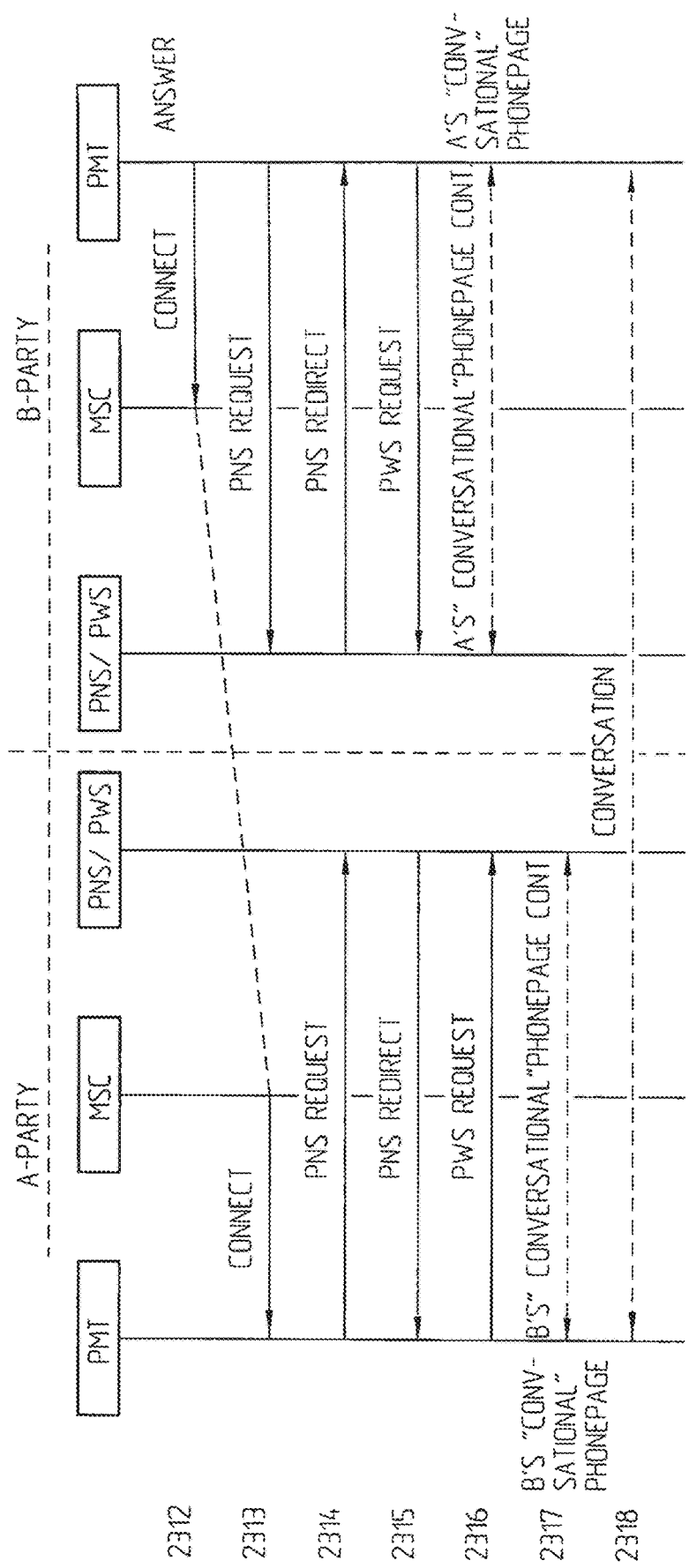
Figure 23C:
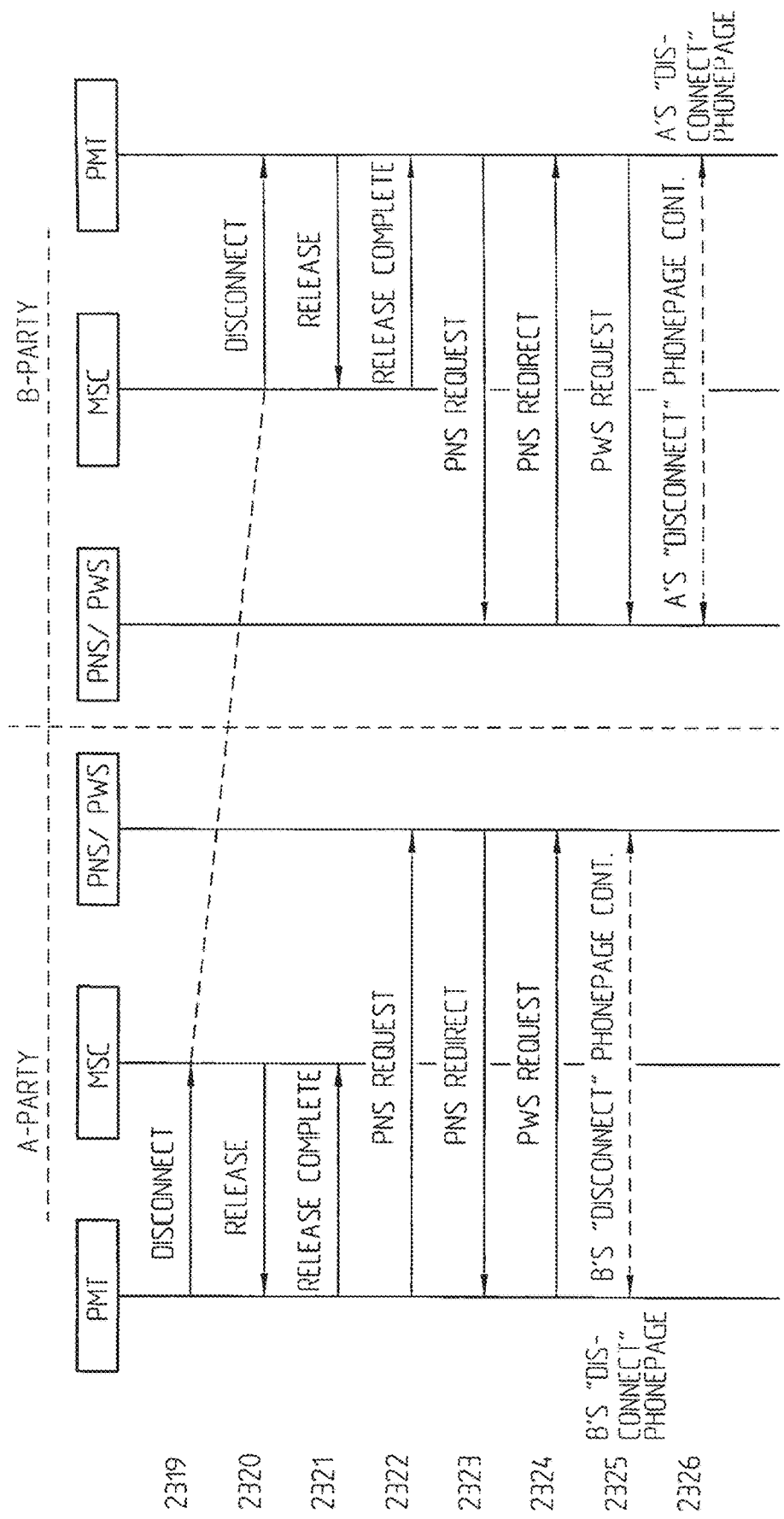

FIG. 23A to 23C show a signaling scheme of an exemplary GSM-type of system, involving a complete call handling sequence between two GSM/GPRS, Class A, PMTs with phonepage functionality. The phonepage function will be readily understood by following the diagram and explanatory text below. Note that this is only an example and that vital signaling has been omitted for clarity. The procedures are:

2301 The A-party phonepage user enters the telephone number of the B-party and presses the SEND button. The PMT sends a SETUP message to the MSC.

2302 The MSC responds with a CALL PROCEED message, which is a triggering event for the phonepage functionality.

2303 A URI is compiled (comprising, for example, the B-number and the PNS server to use) and transferred to the browser, which sends a "PNS Request" message to the PNS. The B-party's PMT is notified using a SETUP message. This message is sent in response to the SETUP message from the A-party. The B-party SETUP message contains (indirectly) a CLI information element revealing the MSISDN of the A-party.

2304 PNS sends a "PNS Redirect" message to the browser in the PMT containing a new URI with a pointer to B's PWS. The B-party's PMT sends a CALL CONFIRMED message to the MSC.

2305 The browser in the A-party's PMT connects to the PWS of the B-party by sending a "PWS Request" message. The B-party's PMT rings and ALERTs the MSC that it is ringing. The ALERT message is a triggering event for the PhonePage functionality.

2306 The A-party PMT obtains B's "Called" phonepage from B's PWS. The phonepage is rendered in the display.

2307 At the B-party, a URI is compiled (comprising, for example, the A-number (CLI) and B's PNS server) and is transferred to the browser, which sends a "PNS Request" message to the PNS.

2308 A ringing control tone is heard by the A-party in response to an ALERT message received from the MSC. The B-party's browser receives a "PNS Redirect" message pointing to the PWS of the A-party.

2309 The browser in the B-party's PMT connects to the PWS of the A-party by sending a "PWS Request" message.

2310 The B-party's PMT obtains A's "Ringing" phonepage from A's PWS. The phonepage is rendered in the display.

2311 The B-party's PMT may ring several times whereby a ringing control tone may be heard at the A-party.

2312 The B-party answers the call. The PMT sends a CONNECT message to the MSC. The CONNECT message is a triggering event for the B-party's phonepage functionality.

2313 In response, the A-party receives a CONNECT message from the MSC, which is a triggering event for the A-party's phonepage functionality. At the B-party, a new URI is compiled and sent to the B-party's PNS server in a "PNS Request" message.

2314 A new URI is also compiled and sent to the A-party's PNS server in a "PNS Request" message. The PNS redirects the browser at the B-party to the A-party's PWS.

2315 The PNS redirects the browser at the A-party to the B-party's PWS. The browser of the B-party connects to the PWS of the A-party by sending a "PWS Request" message.

2316 The browser of the A-party connects to the PWS of the B-party by sending a "PWS Request" message. The B-party's PMT obtains A's "Conversational" phonepage from A's PWS. The phonepage is rendered in the display.

2317 The A-party's PMT obtains B's "Conversational" phonepage from B's PWS. The phonepage is rendered in the display.

2318 Audio conversation may be conducted between the parties from step 2314 to step 2319.

2319 The A-party hangs up and a DISCONNECT message is sent to the MSC.

2320 The MSC responds with a RELEASE message. The MSC sends a DISCONNECT message to the B-party's PMT.

2321 When communication resources are released the A-party PMT sends a RELEASE COMPLETE message to the MSC. The RELEASE COMPLETE message is a triggering event for the A-party's phonepage functionality. A RELEASE message is sent by the B-party's PMT to the MSC.

2322 A new URI is compiled by the A-party's PMT and is sent to the A-party's PNS server in a "PNS Request" message. The RELEASE COMPLETE message is sent to the B-party's PMT. The RELEASE COMPLETE message is a triggering event for the B-party's phonepage functionality.

2223 The PNS redirects the browser at the A-party to the B-party's PWS. A new URI is compiled by the B-party's PMT and is sent to the B-party's PNS server in a "PNS Request" message.

2324 The browser of the A-party connects to the PWS of the B-party by sending a "PWS Request" message. The PNS redirects the browser at the B-party to the A-party's PWS.

2325 The A-party's PMT obtains B's "Disconnect" phonepage from B's PWS. The phonepage is rendered in the display. The browser of the B-party connects to the PWS of the A-party by sending a "PWS Request" message.

2326 The B-party's PMT obtains A's "Disconnect" phonepage from A's PWS. The phonepage is rendered in the display.

2327 The procedure is ended.

N.B. The procedure is exemplary and can only be viewed as an illustration.

PNS Node.

The PNS is logically separated into two entities: a root and a local PNS. These may physically be implemented as separate nodes or integrated into one. The root PNS performs the following functions:

master database of all phonepage links
    registration of phonepage links
    distribution of phonepage link data to local PNSs The root PNS could be implemented in a hierarchical structure enabling high performance service on a global basis.

The local PNS contains a local database of phonepage links and performs the following functions:

reception of phonepage requests from mobile and fixed users (requestees)
    fetching of relevant phonepages associated with each request
    downloading of said phonepages to requestees For capacity and coverage reasons local PNS's will exist in multiple instances. Moreover, to further improve security, availability and performance, a mobile operator may want to have a local PNS directly attached to his backbone.

An individual local PNS node may need to handle thousands of requests per second in a high availability fashion. For this reason a clustered solution with load sharing and redundancy may be employed.

PWS Nodes.

The PNS allows any number of PWSs (c.f. the DNS service that allows any number of homepage servers on the Internet). Thus, there are no limitations on how the load is distributed over actors and geography.

The PWS (phonepage web server) has the following main functions:

Database for storage of phonepages
    Platform on which various phonepage related applications can reside
    Tools allowing end-users to create and manage phonepages
    Communication with PNS, end-users, and management system
    Adaptation of phonepages according to the end-users device and preferences In the context of WAP, the adaptation of phonepages to the user's device can be handled according to the mechanisms defined in UAProf.

Typically, a PWS may be implemented using standard web servers (e.g., Apache) with tailor-made servlets that may parse the phonepage parameter lists and that generate phonepages that are suitable for the recipient's phonepage device.

Peer to Peer Phonepage.

According to a variant of the invention, translation of numbers and events to URLs can be made in the UE itself. Upon detection of a triggering event, the UE looks in a memory position (e.g., SIM card or address book) and retrieves or computes a URL corresponding to a particular other party and event. The URL is then conveyed to the other party via SMS. Upon reception of the URL by the other part, the data objects are automatically retrieved.

In another variant of the present invention, USSD or UUI (User-User Information) according to the GSM standard can be used to convey an URL instead of an SMS. In yet another variant, IP signaling between two UIs can be used for conveying the SMS instead of using SMS.

Obtaining Caller-Originated Alerts in IP-Based Communications.

According to one aspect of the present invention, while a first user equipment (UE) such as a mobile device or stationary device is attempting to establish a communication session (e.g., a voice call session or an instant messaging session) with a second UE, the first UE may cause a customized alert signal to be provided to the second UE, prior to the establishment of the communication session, to alert the user of the second UE of the upcoming communication session. Specifically, upon selection of the second UE for communication, the first UE may transmit a call setup request to a communication server and also indicate to the communication server the intent to send a customized alert signal. This customized alert signal may be referred to generally as "a caller-originated alert signal" or "a caller-originated alert," wherein the word "caller" refers to a party who initiates a communication session but is not limited to voice calls. The communication server may initiate the call setup with the second UE and instruct it to obtain the caller-originated alert signal from a PhonePage server. The second UE may then contact the PhonePage server to request the caller-originated alert signal. Once the caller-originated alert signal has been successfully pulled, the second UE may render the caller-originated alert signal to alert its user of the communication session.

Figure 24:
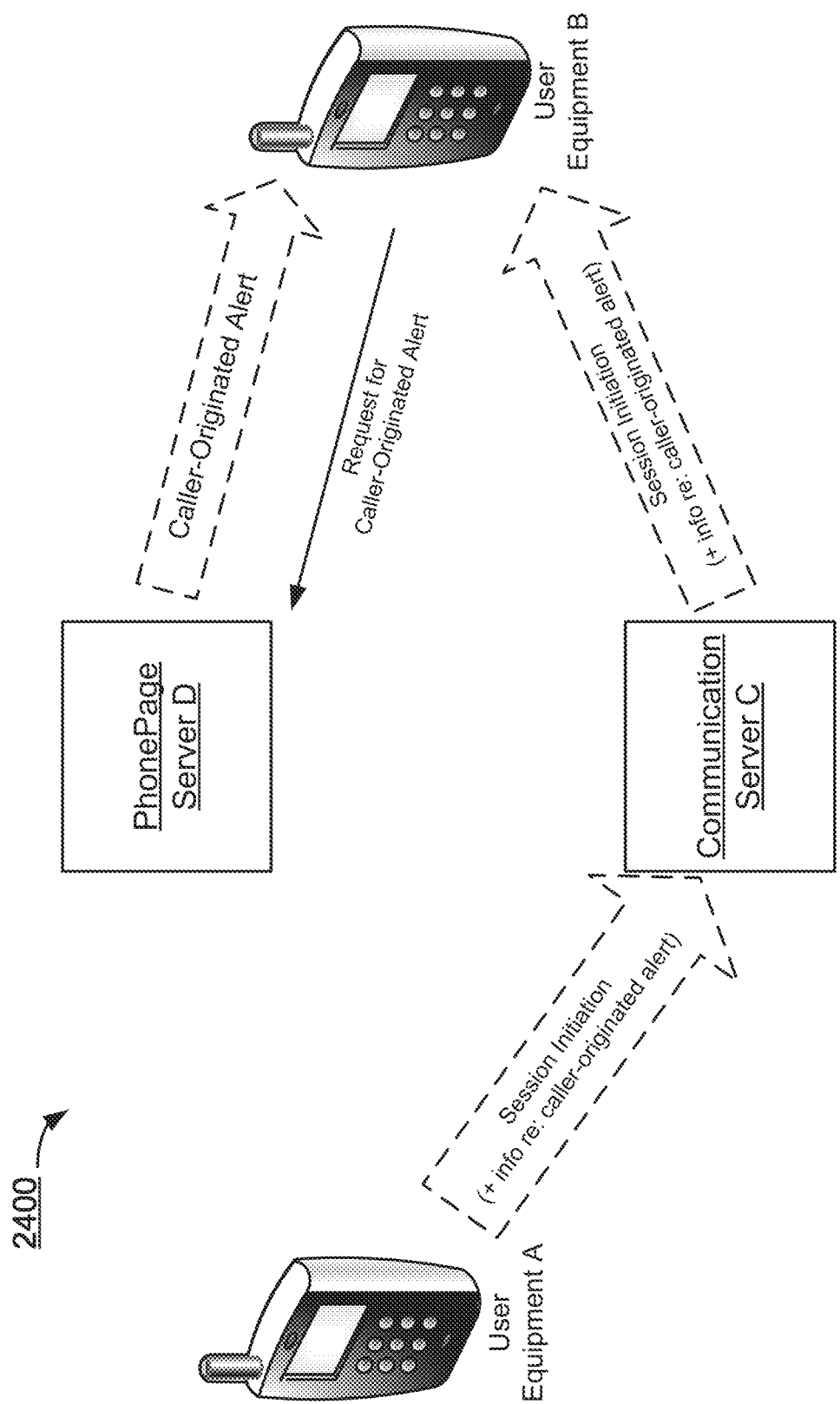
FIG. 24 shows a block diagram illustrating an exemplary system for obtaining caller-originated alert signals in an IP-based communication session in accordance with an embodiment of the present invention.

Referring to FIG. 24, there is shown a block diagram illustrating an exemplary system 2400 for obtaining caller-originated alert signals in an IP-based communication session in accordance with an embodiment of the present invention. The system 2400 may comprise a first user equipment (UE A), a second user equipment (UE B), a communication server C, and a PhonePage server D.

The UE A, as described above in connection with FIGS. 1, 5, 11, and 15, may be a mobile telephone or a mobile telephone connected to any kind of data equipment, e.g., personal digital assistant (PDA) devices or laptop computer. The UE A may also be a fixed non-mobile device such as a desktop computer, a gaming device, an IP telephone, or other devices which can initiate and receive communications. The UE A is capable of communicating with other user equipment such as UE B in a variety of ways. For example, UE A may establish a voice call, such as a Voice-over-IP (VOIP) call, with UE B. UE A may also establish a wireless "walkie-talkie" session based on the push-to-talk (PTT) technology. UE A may alternatively establish a data or multimedia communication session (e.g., email, instant messaging, online meeting, document sharing, and file transfers) with UE B. UE B may typically have comparable or at least compatible functionalities in order to communicate with UE A.

Both UE A and UE B may be configured to communicate with the PhonePage server D. The PhonePage server D may comprise a PhonePages number server (PNS) and/or PhonePage web server (PWS). As illustrated in FIG. 5, the PhonePage server D may communicate with UE B via one or more logical channels, typically to receive requests from UE B and to fulfill those requests according to an established messaging or signaling protocol. The PhonePage server D may also communicate with UE A, for example, to receive uploads of alert signals.

The communication server C may be any type of communication equipment that hosts or facilitates communication sessions among two or more user equipment. For example, the communication server C may be a proxy server or a similar network element. The communication session between UE A and UE B may be carried on a packet-switched network. For example, the communication session may be a VoIP call or an instant messaging (IM) session that traverses an IP-based network (e.g., the Internet). Or, the communication session may be a voice call or data session that is partially carried on an IP-based network and partially carried on a telephone (land-line and/or wireless) network.

According to one embodiment of the present invention, a first user who is associated with UE A, i.e., User A, may attempt to initiate a communication session with a second user who is associated with UE B, i.e., User B. Prior to establishment of the communication session, User A may select User B either from a locally-stored or online phonebook or buddy list or by directly entering an identifier of User B or UE B. In conjunction with the selection, User A may create or select a caller-originated alert signal that will be used to alert User B of the upcoming communication session. For example, User A may record a personalized voice message or ring-tone or, more typically, select a pre-recorded alert signal that is stored locally or online.

Then, UE A may transmit session initiation information to the communication server C to be relayed to UE B. The session initiation information may include the identity of User B or UE B. The session initiation information may also include or be accompanied by a request for a caller-originated alert to be provided to UE B. The request for the caller-originated alert may include an indication of User A's intent to alert User B of the communication session with a caller-originated alert. In addition, the request may also include the identity of or selection criteria for the caller-originated alert to be sent to UE B. Alternatively, the request may include an address or identifier of the PhonePage server D (or another data source) from which the call-originated alert is available.

Upon receiving the session initiation information and the request for the caller-originated alert, the communication server C may initiate the communication session with UE B. The communication server C may forward at least a portion of the session initiation information to UE B. The communication server C may further forward to UE B information associated with the incoming caller-originated alert and instruct UE B to obtain it from the PhonePage server D.

If User B has muted alert functions on UE B, for example, during a meeting or in a theater, UE B may reject the incoming caller-originated alert. Alternatively, UE B may still proceed to download the caller-originated alert signal and then apply User B's settings to determine how UE B renders the alert signal. Both options may be accommodated by a protocol among UE A, UE B and the PhonePage server D. The protocol may allow UE B to reject the caller-originated alert or allow UE A or the PhonePage server D to override UE B's rejection in case User B does not have the right to reject a certain alert, either for commercial (e.g., condition of service) or regulatory reasons.

Prior to establishing the communication session with UE A, UE B may contact the PhonePage server D to request the caller-originated alert. For example, if UE A does not provide a caller-originated alert but indicates its intent for UE B to render a caller-originated alert, UE B may contact a default PhonePage server (e.g., PhonePage server D) whose address is either stored locally on UE B or can be determined from another remote location (e.g., from User A's profile on a social networking website). If UE A has specifically included a source address of the caller-originated alert signal, UE B may ignore any default address and contact a PhonePage server at the specified address for the caller-originated alert signal. If UE A has provided the identity of a pre-stored alert signal, UE B may forward that identity to the PhonePage server D such that it can quickly locate the pre-stored alert signal. Even if the intent, address, identity elements are absent from UE A's messages, UE B may still forward the identities of User A and User B to the PhonePage server D and cause the PhonePage server D to select a suitable, pre-stored alert signal based on User A's preference(s) and/or other factors. Selection of a pre-stored alert signal may be done automatically based on one or more factors such as the identity of User B, the proximity of User B to User A, the type/context of the attempted communication session, time of day, both parties' subscription to a "buddy" alert signal service, and other specific triggering events that may trigger a phonepage request as described above. In some instances, the PhonePage server D may need to retrieve the requested alert signal from another source of data objects.

Once the caller-originated alert has been selected and/or retrieved, the PhonePage server D may provide the caller-originated alert to UE B. According to one embodiment of the present invention, UE B may download the caller-originated alert from the PhonePage server D in one data package. Once the data package has been fully downloaded to UE B, UE B may render the caller-originated alert to notify the User B that a communication session with User A is pending. Alternatively, according to another embodiment of the present invention, UE B may stream the caller-originated alert from the PhonePage server D. That is, without waiting for the caller-originated alert to be fully downloaded, UE B may start rendering it to alert User B of the communication session. In addition, UE B may display caller-ID information that has been received in the call setup request from the communication server C.

Upon successfully obtaining the caller-originated alert by UE B, the communication session between UE A and UE B may be fully set up after UE B renders the alert and User B accepts the session initiated by User A. If UE B fails to obtain the caller-originated alert from the PhonePage server D as requested, UE B may notify the communication server C and/or UE A of the failure status. UE B may then either render a default alert signal to alert User B or simply forego the step of rendering any alert signal.

The communication between UE A and UE B, via the communication server C, may be carried on a first logical channel at least a portion of which traverses a packet-switched network (e.g., Internet or a private intranet). The communication between the PhonePage server D and UE B may be carried on a second logical channel.

Figure 25:
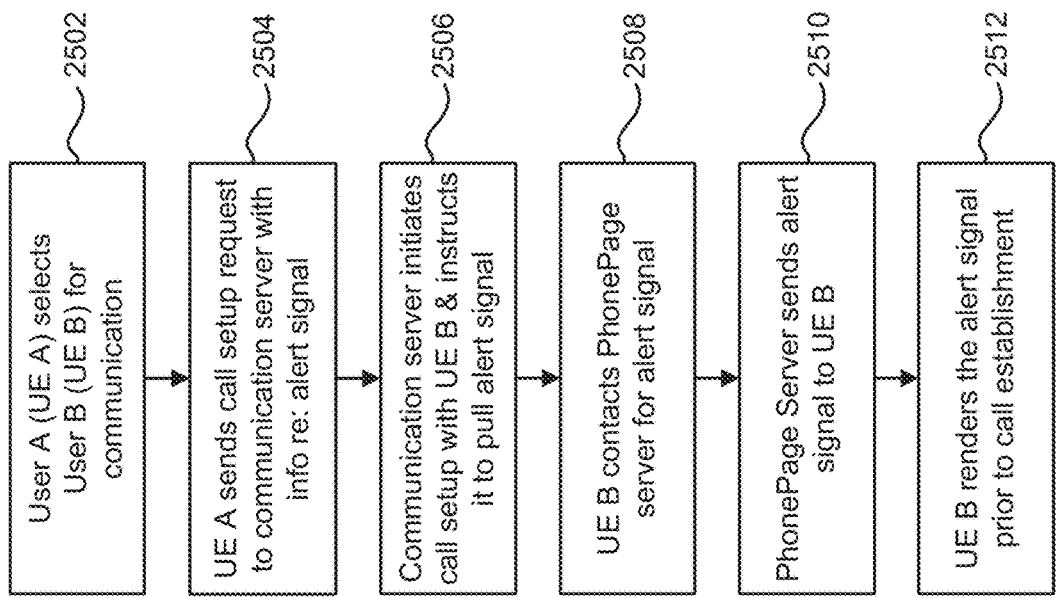
FIG. 25 shows a flow chart illustrating an exemplary method for obtaining caller-originated alert signals in an IP-based communication session in accordance with an embodiment of the present invention.

FIG. 25 shows a flow chart illustrating an exemplary method for obtaining caller-originated alert signals in an IP-based communication session in accordance with an embodiment of the present invention.

In step 2502, User A (UE A) may select User B (UE B) for communication. The attempted communication session may be any type of IP-based sessions such as voice, data, multimedia sessions, or a combination thereof. For illustration purposes, UE A and UE B will be described hereinafter as mobile telephone devices although they may be any type of user equipment as described above. To select User B for communication, User A may simply choose User B from a list of contacts or enter a mobile phone number associated with User B.

In step 2504, UE A may send a call setup request to a communication server. The communication server may be typically a network element in an IP network that helps call signaling and routing between any two or more user equipment. Depending on the type of communication as well as the specific network or application used, UE A may follow the relevant protocol to send, for example, session initiation messages to the communication server. The communication session is not limited to a one-to-one type of communication, but may be part of a multiple-party communication (e.g., a conference call or an online meeting). That is, either or both of UE A and UE B may simultaneously communicate with other parties.

The call setup request sent to the communication server may also indicate User A's intent to provide a caller-originated alert, such as a personalized alert signal, to UE B. For example, when dialing the call, User A may indicate whether the attempted communication session will be in a conventional alert mode (i.e., without any caller-originated alert) or a caller-originated alert mode (i.e., with a caller-originated alert). User A may depress one or more assigned keys to indicate a caller-originated alert mode. User A may also include in the call setup request one of the following items: the alert signal itself, an identity of the alert signal, an address or identifier of a PhonePage server to download the alert signal from, an instruction to select an alert signal for User B optionally coupled with one or more selection criteria for picking a suitable alert signal.

In step 2506, the communication server may initiate the call setup with UE B. If User B is not available (e.g., offline), the communication server may notify User A of this status. If User B is available, the communication server may notify UE B of the incoming call, for example, by forwarding at least a portion of the session initiation messages from UE A, either as received or with modification. In addition, the communication server may notify UE B of the alert signal desired by User A and instruct UE B to obtain the alert signal based on relevant information received from UE A.

In step 2508, UE B may contact a PhonePage server in order to obtain the personalized alert signal. The PhonePage server may be identified to UE B in UE A's call setup messages. Or, the PhonePage server may be a default source of data object for UE B if it does not receive a specified source address. If the identity of the personalized alert signal has been received from UE A, UE B may simply forward that identity to the PhonePage server. Otherwise, UE B may send the identities of Users A and B to the PhonePage server and instruct the PhonePage server to select a pre-stored alert signal according to User A's preferences and/or other factors.

In step 2510, the PhonePage server may transmit the personalized alert signal to UE B over a logical channel such as an Internet connection. As mentioned above, UE B may download the entire alert signal before rendering it. Alternatively, the personalized alert signal may be streamed to UE B in a series of data packets which UE B can begin rendering without waiting for the entire alert signal to be downloaded. The delivery of the personalized alert signal may follow any IP-based, multimedia streaming or download protocol such as Stream Control Transmission Protocol (SCTP).

In step 2512, the personalized alert signal may be rendered on UE B. Prior to establishment of the communication session with UE A, UE B may play back the personalized alert signal to alert User B of the pending communication session with User A. How UE B handles the session notification and the related alert signal(s) may have already been configured, and the pre-configured rules or preferences may be automatically executed without prompting User B for a selection. For example, UE B may establish default rules for handling incoming calls accompanied by personalized alert signals, and the default rules may either be globally applicable to all callers or vary according to specific callers. Typically, a caller-originated alert may be treated by UE B like any other alert signal or alert signal. For example, the caller-originated alert may be muted when User B is in an environment where quietness is necessary.

Figure 26:
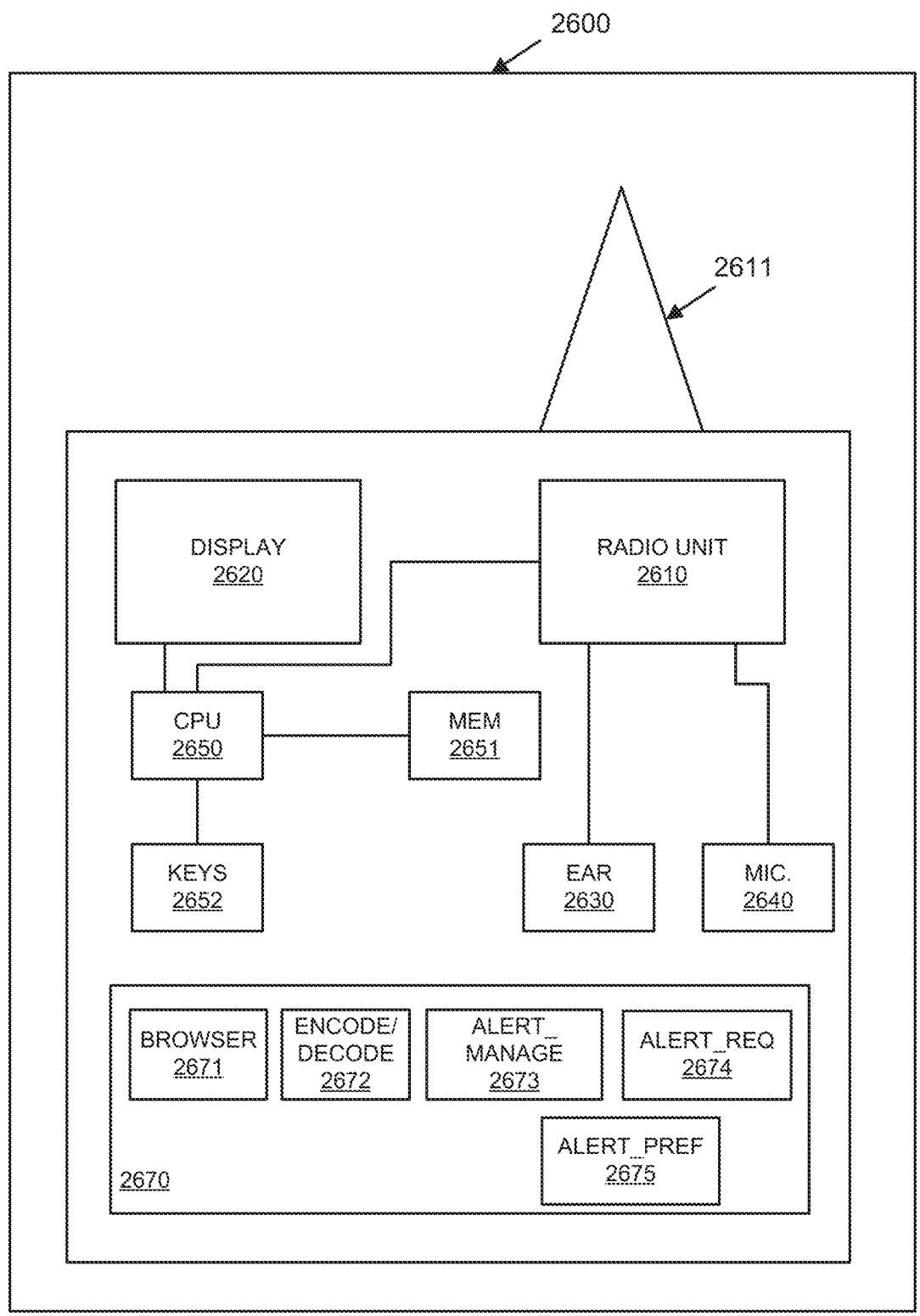
FIG. 26 shows a block diagram illustrating an exemplary user equipment for requesting and/or receiving caller-originated alert signals in an IP-based communication session in accordance with an embodiment of the present invention.

FIG. 26 shows a block diagram illustrating an exemplary user equipment 2600 for requesting and/or receiving caller-originated alert signals in an IP-based communication session in accordance with an embodiment of the present invention. The UE 2600 may comprise a central processing unit (CPU) 2650, at least one memory unit 2651, at least one display 2620, at least one user input device 2652 which may be a keypad, keyboard, touchscreen, or the like, a radio unit 2610, an antenna 2611, at least one speaker 2630 for audio output, at least one microphone 2640 for audio input, all of which may be substantially the same or similar to those corresponding components described above in connection with FIG. 11.

The UE 2600 may further comprise a plurality of programs 2670, including, for example, a browser 2671 that can render at least one type of data object (e.g., caller-originated alerts) and an encode/decode unit 2672 that encodes (or encrypts) requests for data objects and decodes (or decrypts) data objects. In addition, in order to implement the provision of caller-originated alert signals, the UE 2600 may also comprise a caller-originated alert management application 2673 (Alert_Manage), an application for requesting caller-originated alerts 2674 (Alert_Req), and a caller-originated alert preference module 2675 (Alert_Pref). Both the Alert_Manage application 2673 and the Alert_Req application 2674 may be embedded software programs that run automatically or in response to activation.

When UE 2600 is a device that initiates a communication session with another UE, the Alert_Req application 2674 may respond to an express or implied selection of a caller-originated alert signal by automatically generating a request to be sent to a communication server together with a call setup request. Selection methods may include the user press of an appropriate dedicated or non-dedicated ("soft") selection key, completion of the recording of an alert signal, or default instructions and options stored in the UE memory. The Alert_Req application 2674 may include in the request either the caller-originated alert itself or relevant information, such as an address of a PhonePage server, an identity of the caller-originated alert signal, and/or the identity of the called party, to enable the other UE to obtain a caller-originated alert signal from a PhonePage server. The radio unit 2610 may then transmit the request to the communication server.

When UE 2600 is a device that is on the receiving end of a communication session with another UE, the Alert_Req application 2674 may respond to a call setup request and automatically generate a request to be sent to a PhonePage server. The Alert_Req application 2674 may include in the request relevant information associated with a caller-originated alert, such as an identity of the caller-originated alert signal and/or the identity of the calling party, to enable the PhonePage server to locate a suitable caller-originated alert. The radio unit 2610 may then transmit the request to the PhonePage server.

The Alert_Manage application 2673 may be responsible for handling caller-originated alerts that are associated with outgoing and/or incoming calls or communication sessions. Generation of the requests for caller-originated alerts and/or the management of any received caller-originated alerts may be conditioned on or related to preference settings that are stored in and/or managed by the Alert_Pref module 2675.

At this point it should be noted that the technique for obtaining caller-originated alert signals in IP-based communication sessions in accordance with the present disclosure as described above typically involves the processing of input data and the generation of output data to some extent. This input data processing and output data generation may be implemented in hardware or software. For example, specific electronic components may be employed in a UE, a communications server, or similar or related circuitry for implementing the functions associated with obtaining caller-originated alert signals in IP-based communication sessions in accordance with the present disclosure as described above. Alternatively, one or more processors operating in accordance with stored instructions may implement the functions associated with obtaining caller-originated alert signals in IP-based communication sessions in accordance with the present disclosure as described above. If such is the case, it is within the scope of the present disclosure that such instructions may be stored on one or more processor-readable program storages (e.g., a magnetic or optical disk or solid-state memory), or transmitted to one or more processors via one or more signals.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method for obtaining caller-originated alert signals in an IP-based communication session, the method comprising:
receiving, from a first user equipment, a request to initiate a communication session between the first user equipment and a second user equipment, the request including an indication of an intent to provide a caller-originated alert from a phonepage server;
determining that a rejection of the caller-originated alert has been overridden by the phonepage server when the second user equipment does not have the right to reject the caller-originated alert;
in response to the override, sending a server request from the second user equipment to the phonepage server, the server request identifying each of the first user equipment and the second user equipment, and causing the phonepage server to transmit the caller-originated alert based on identities of the first and second user equipment;
receiving the caller-originated alert from the phonepage server; and
rendering the caller-originated alert to alert a user associated with the second user equipment.

2. The method of claim 1, further comprising receiving the request from the first user equipment via a first communication channel and receiving the caller-originated alert from a phonepage server via a second communication channel.

3. The method of claim 1, wherein the request to initiate the communication session further comprises information associated with the caller-originated alert.

4. The method of claim 1, wherein the caller-originated alert received at the second user equipment is the caller-originated alert that was provided from the first user equipment initially in the request.

5. The method of claim 1, further comprising rendering a default alert when the caller-originated alert is unavailable from the phonepage server.

6. The method of claim 1, further comprising establishing the communication session with the first user equipment after rendering the caller-originated alert.

7. A method for obtaining caller-originated alert signals in an IP-based communication session, the method comprising:
   receiving, from a first user equipment, a first request to initiate a communication session between the first user equipment and a second user equipment, the first request including an indication of an intent to provide a caller-originated alert from a phonepage server;
   when the second user equipment does not have the right to reject the caller-originated alert, determining that a rejection of the caller-originated alert has been overridden by the phonepage server;
   in response to the override, sending a second request from the second user equipment to the phonepage server based on information received from the first user equipment;
   in response to sending the second request, receiving the caller-originated alert at the second user equipment; and
   rendering the caller-originated alert to alert a user associated with the second user equipment.

8. The method of claim 7, further comprising receiving the first request from the first user equipment via a first communication channel and receiving the caller-originated alert via a second communication channel.

9. The method of claim 7, further comprising establishing the communication session with the first user equipment after rendering the caller-originated alert.

10. A user equipment for obtaining caller-originated alert signals in an IP-based communication session, the user equipment comprising:
   a processor operatively coupled to at least one memory unit, a user interface, and a communication unit; and
   the processor being configured to:
      receive, from a first user equipment, a request to initiate a communication session, the request including an indication of an intent to provide a caller-originated alert from a phonepage server;
      determine that a rejection of the request has been overridden by the phonepage server when the user equipment does not have the right to reject the request;
      in response to the override, send a server request to the phonepage server, the server request identifying each of the first user equipment and the user equipment, and causing the phonepage server to transmit the caller-originated alert based on identities of the first user equipment and the user equipment;
      receive the caller-originated alert; and
      render the caller-originated alert to alert a user associated with the second user equipment.

\* \* \* \* \*